United States Patent
Tomita et al.

(10) Patent No.: US 6,340,014 B1
(45) Date of Patent: *Jan. 22, 2002

(54) CONTROL FOR DIRECT FUEL INJECTION SPARK IGNITION INTERNAL COMBUSTION ENGINE

(75) Inventors: Masayuki Tomita, Milton Keyns (GB); Kimiyoshi Nishizawa, Yokohama (JP)

(73) Assignee: Nissan Motor Co., Inc., Yokohama (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/271,205

(22) Filed: Mar. 17, 1999

(30) Foreign Application Priority Data

Mar. 17, 1998 (JP) ............................................. 10-066927
Feb. 24, 1999 (JP) ............................................. 11-046612

(51) Int. Cl.$^7$ ................................................. F02B 17/00
(52) U.S. Cl. ........................ 123/295; 60/285; 123/299
(58) Field of Search ................................. 123/295, 299, 123/300; 60/274, 284, 285

(56) References Cited

U.S. PATENT DOCUMENTS

| 5,642,705 A | 7/1997 | Morikawa et al. ........... 123/300 |
| 5,967,113 A * | 10/1999 | Kaneko et al. ............. 123/295 |
| 6,044,642 A | 4/2000 | Nishimura et al. ........... 60/285 |

FOREIGN PATENT DOCUMENTS

| EP | 0 856 655 | 8/1998 |
| JP | 60-30440 | 2/1985 |
| JP | 62-191622 | 8/1987 |
| JP | 2-169834 | 6/1990 |
| JP | 8-100638 | 4/1996 |
| JP | 8-296485 | 11/1996 |
| JP | 10-212987 | 8/1998 |

* cited by examiner

Primary Examiner—Tony M. Argenbright
(74) Attorney, Agent, or Firm—Foley & Lardner

(57) ABSTRACT

During a period from an engine start to activation of a catalytic emission control device, a direct injection spark ignition engine is operated in a stratified stoichiometric charge combustion mode under the control of an engine controller. In the stratified stoichiometric combustion mode, a fuel injection system carries out a direct cylinder injection on the compression stroke to produce a relatively rich stratified air fuel mixture closely around a spark plug, in a background of a relatively lean air fuel mixture produced homogeneously over the combustion chamber by a direct cylinder injection on the intake stroke or a port or passage injection on or before the intake stroke.

22 Claims, 24 Drawing Sheets

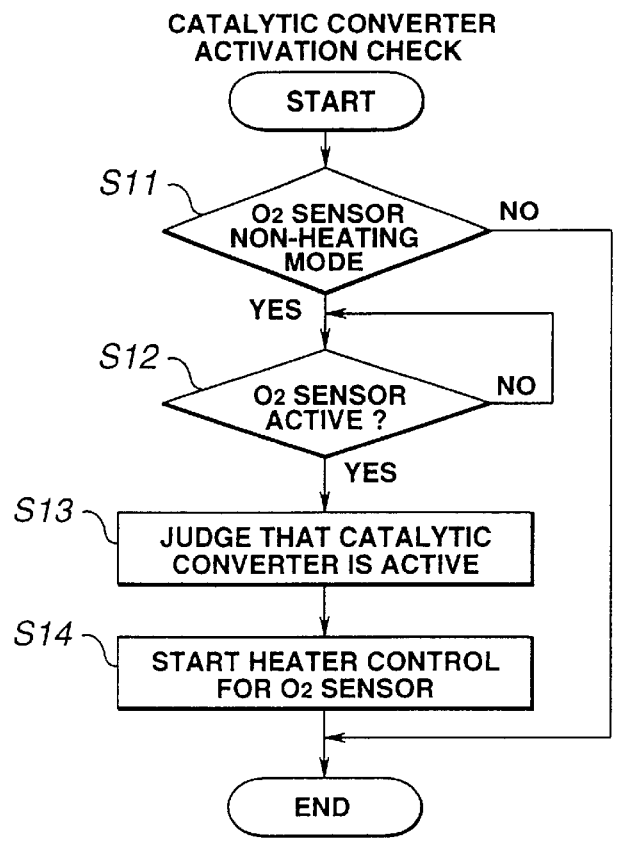
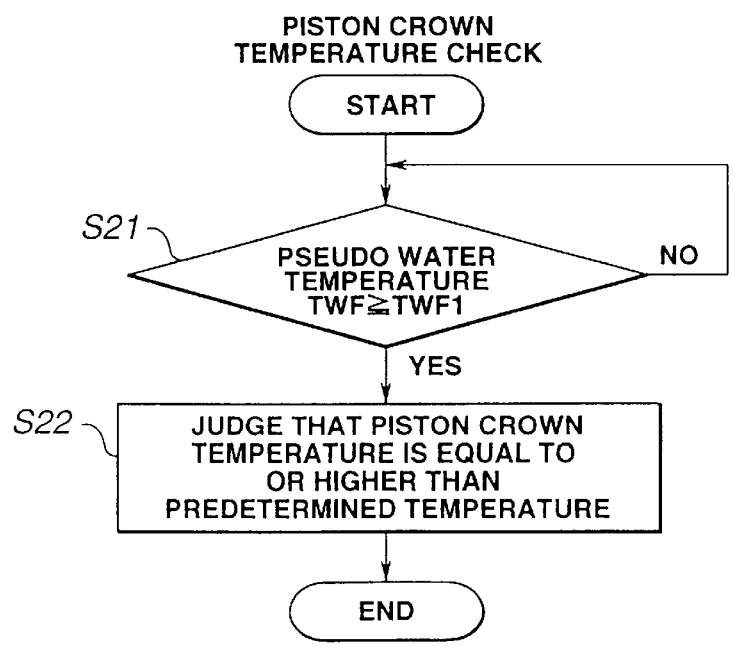

CONTROL FOR DIRECT FUEL INJECTION SPARK IGNITION INTERNAL COMBUSTION ENGINE

BACKGROUND OF THE INVENTION

The present invention relates to technique for controlling a direct fuel injection spark ignition internal combustion engine.

Recently, the technique of direct cylinder injection in a spark ignition engine is under development to improve the fuel efficiency and emission control by Injecting fuel directly into a combustion chamber (or each combustion chamber). A control system for such a type normally effects combustion of a homogeneous air fuel mixture distributed uniformly throughout the combustion chamber by fuel injection on the intake stroke. In a predetermined engine operating region (such as a region of low speeds and low loads), the control system achieves ultra lean combustion by producing an ignitable stratified mixture closely around the spark plug by fuel injection on the compression stroke.

Japanese Patent Provisional (Kokai) Publications Nos. 62(1987)-191622 and 2(1990)-169834 disclose internal combustion engines of such a type. Japanese Patent Provisional (Kokal) Publications Nos. 8(1996)-296485 and 8(1996)-100638 further disclose related technology for activation of a catalytic converter.

SUMMARY OF THE INVENTION

The control system of the above-mentioned Japanese Patent Publication 8(1996)-296485 according to one interpretation is arranged to inject an additional amount of fuel into a combustion chamber during an open period of an exhaust port on the exhaust stroke so that much of the additional fuel is left unburned and supplied to the catalytic converter to promote combustion of the unburned fuel in the catalytic converter and to increase the temperature In the catalytic converter. However, this system presupposes the reaction of the unburned fuel on the catalyst, so that this system is not sufficiently effective in the state in which the catalyst is not active at all. Moreover, the reduction of time from a start of activation to complete activation entails deterioration of emission control performance (specifically HC emission to the atmosphere) during the control.

The control system of the above-mentioned Japanese Patent Publication 8(1996)-100638 is arranged to inject additional fuel into the combustion chamber on the early stage or intermediate stage of the expansion stroke. By flame propagation, the additional fuel is ignited and burned to increase the exhaust gas temperature. By increasing the exhaust gas temperature, this system can increase the temperature of the catalytic converter irrespective of whether the catalytic converter is activated or not. However, when the temperature in the combustion chamber is too low to promote vaporization of liquid fuel as in a period immediately after a start of the engine, part of the additional fuel is likely to be left unburned and emitted to the atmosphere.

{Japanese Patent Provisional (Kokai) Publication No. 10(1998)-169488 (published on Jun. 23, 1998) shows earlier (non prior art) technology for increasing the exhaust temperature.}

It is an object of the present invention to provide system and process for promoting activation of a catalytic emission control device for exhaust gas purification, and reducing HC emission during the activation.

According to the present invention, an engine system comprises a direct injection spark Ignition internal combustion engine, and an engine controller.

The engine comprises a fuel injector for injecting fuel directly into a combustion chamber of the engine, and a spark plug for igniting an air fuel mixture in the combustion chamber.

The engine controller operates the engine in a first stratified charge combustion mode for producing a substantially stoichiometric air fuel mixture concentrated around the spark plug at a time of ignition in a predetermined engine operating region by controlling fuel injection quantity and timing of fuel injection during a compression stroke by the fuel injector and ignition timing of the spark plug. Furthermore, the engine controller detects a predetermined request condition requesting a temperature increase of a catalytic emission control device disposed in an exhaust passage of the engine, and operates the engine in a second stratified charge combustion mode for producing a richer-than-stoichiometric air fuel mixture of a rich air fuel ratio richer than a stoichiometric ratio concentrated around the spark plug at the time of ignition by controlling the fuel injection quantity and fuel injection timing of compression stroke fuel injection on the compression stroke by the fuel injector and the ignition timing of the spark plug when the predetermined request condition is detected.

According to the present invention, an engine control process for controlling a direct injection spark ignition internal combustion engine which comprises a fuel injector for injecting fuel directly into a combustion chamber of the engine, and a spark plug for igniting an air fuel mixture in the combustion chamber, comprises: operating the engine in a first stratified charge combustion mode for producing an substantially stoichiometric air fuel mixture concentrated around the spark plug at a time of Ignition in a predetermined engine operating region by controlling fuel injection quantity and timing of fuel Injection during a compression stroke by the fuel injector and ignition timing of the spark plug; detecting a predetermined request condition requesting a temperature increase of a catalytic emission control device disposed in an exhaust passage of the engine; and operating the engine in a second stratified charge combustion mode for producing a richer-than-stoichiometric air fuel mixture of a rich air fuel ratio richer than a stoichiometric ratio concentrated around the spark plug at the time of ignition by controlling the fuel injection quantity and fuel injection timing of compression stroke fuel injection on the compression stroke by the fuel injector and the ignition timing of the spark plug when the predetermined request condition is detected.

BRIEF DESCRIPTION OF THE DRAWINGS

FIG. 3 is a flowchart showing a process for activation check performed by the controller of FIG. 1.

FIG. 5 is a flowchart showing a process for piston temperature check performed by the controller of FIG. 1.

DETAILED DESCRIPTION OF THE INVENTION

Figure 1:
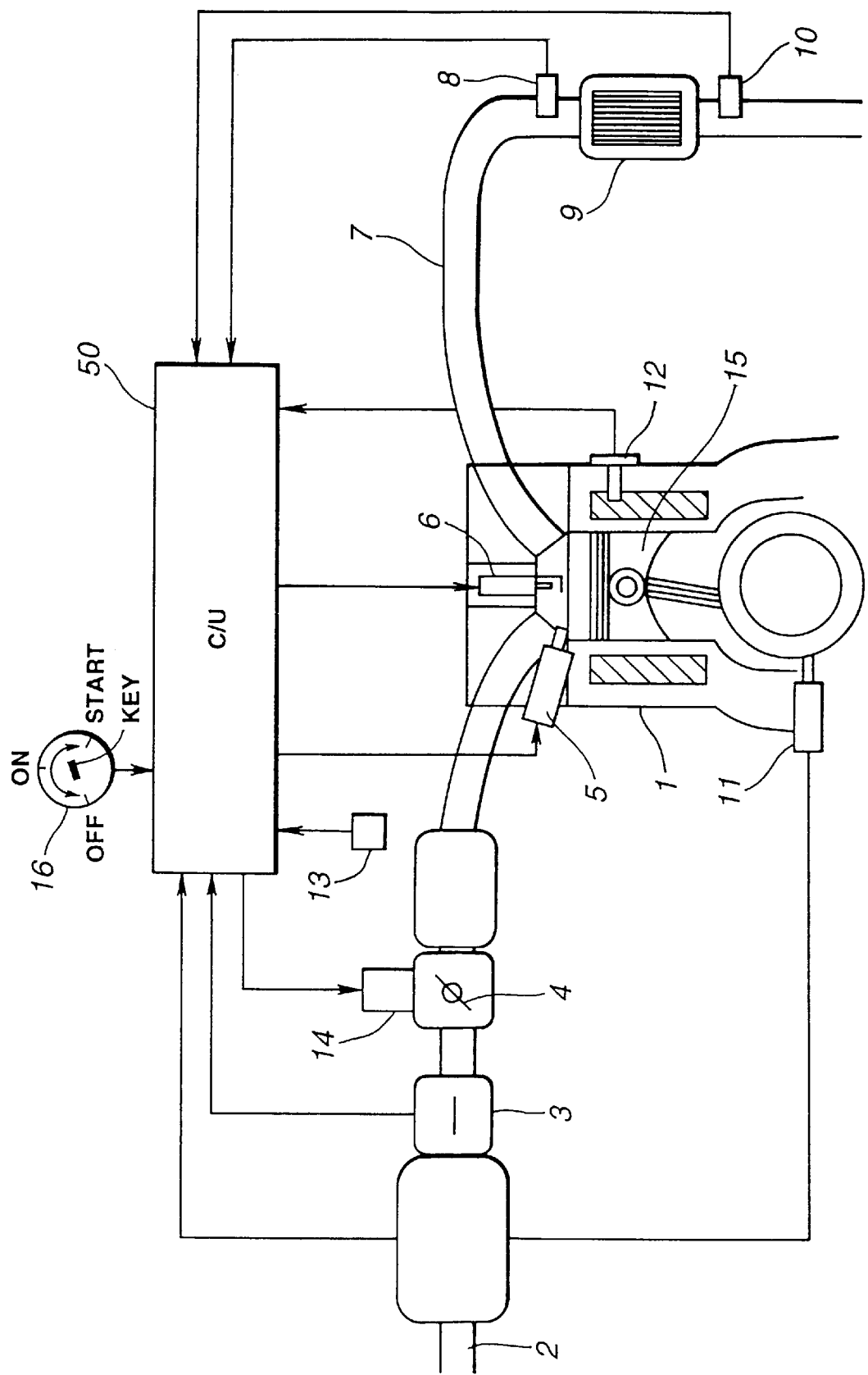
FIG. 1 is a schematic view showing a system of a direct cylinder injection type engine and an engine controller according to a first embodiment of the present invention.

FIG. 1 shows an engine system according to a first embodiment of the present invention. This system is a control system comprising an engine 1 as a main component of a controlled system and an engine controller which comprises a control unit 50 as a main unit.

The engine 1 is a direct injection spark ignition internal combustion engine.

An intake system for the engine 1 comprises an intake passage 2. The intake passage 2 has therein an air flowmeter 3 and a throttle valve 4. The air flowmeter 3 senses an intake air flow rate Qa. The throttle valve 4 controls the intake air flow rate Qa.

A fuel system comprises fuel injectors 5 each provided for a corresponding cylinder of the engine 1. The injector 5 of each cylinder injects fuel directly into the combustion chamber under the control of a drive pulse signal supplied from the control unit 50 (that is, the main unit of the engine controller). The fuel system further has a fuel pump (not shown) for supplying the fuel under pressure and a pressure regulator (not shown) for regulating the pressure of the fuel supplied to the fuel injectors 5 at a controlled level. The fuel system of this example is a fuel injection system.

A spark plug 6 is provided for each cylinder. The spark plug 6 of each cylinder ignites the air fuel mixture in the combustion chamber in response to an ignition control signal delivered from the control unit 50.

An exhaust system comprises an exhaust passage 7. An air fuel ratio sensor 8 Is provided in the exhaust passage 7. The air fuel ratio sensor 8 senses an air fuel ratio of the exhaust gas mixture and hence the air fuel ratio of the intake gas mixture, by sensing a content of a predetermined substance such as oxygen in the exhaust gas mixture. The air fuel ratio sensor may be an oxygen sensor for producing an output signal indicating rich side or lean side, or may be a wide range air fuel ratio sensor capable of sensing the air fuel ratio linearly over a wide range.

An exhaust emission control device 9 for purifying the exhaust emission is disposed in the exhaust passage 7 at a location on the downstream side of the air fuel ratio sensor 8. The exhaust emission control device 9 of this example is a catalytic converter, which can employ a three way catalyst capable of oxidizing CO and HC and reducing NOx in the exhaust gas mixture efficiently at or near the stoichiometric air fuel ratio $\{\lambda=1, A/F$ (a mass ratio of air to fuel)$\approx 14.7\}$, and/or an oxidizing catalyst capable of oxidizing CO and HC.

A downstream side oxygen sensor 10 is disposed in the exhaust passage 7, on the downstream side of the catalytic converter 9. The downstream side oxygen sensor 10 senses the oxygen content of the exhaust gas mixture and produces a sensor output signal indicative of rich side or lean side deviation.

The engine system of the example shown in FIG. 1 employs a so-called duel air fuel ratio sensor system for performing a feedback air fuel ratio control in accordance with the output of the upstream side air fuel ratio sensor 8, and modifying the feedback air fuel ratio control in accordance with the output of the downstream side oxygen sensor 10 to reduce control error due to degradation of the air fuel ratio sensor 8 or the like. However, it is optional to omit the downstream side oxygen sensor 10 when the plain feedback air fuel ratio without modification suffices. It is further optional to omit both of the air fuel ratio sensor 8 and the downstream side oxygen sensor 10 when the feedback control is not needed.

In this example, there is further provided a crank angle sensor 11. The control unit 50 determines the engine revolution speed Ne by counting pulses of a unit crank angle signal produced by the crank angle sensor 11 in synchronism with the engine revolution to determine the count over a predetermined time interval, or by measuring a period of a reference crank angle signal produced by the crank angle sensor 11.

A water temperature sensor 12 is arranged to sense the temperature TW of the cooling water in a water jacket of the engine 1.

A throttle sensor 13 senses an opening degree of the throttle valve 4. (The throttle sensor 13 can serve as an idle switch.)

In this example, a throttle control unit 14 is provided for varying the throttle opening of the throttle valve 4 with an actuator such as a DC motor.

The throttle control unit 14 of this example is capable of controlling the throttle opening of the throttle valve 4 electronically in response to a drive signal supplied from the control unit 50 so as to achieve a demand torque calculated in accordance with a driver's accelerator input such as an accelerator depression degree.

The control unit 50 receives output signals of these sensors and other input devices and thereby collects input information on vehicle operating conditions. The control unit 50 of this example includes, as a main component, a microcomputer having CPU, ROM, RAM, A/D converters, and input/output interfaces. In accordance with the operating conditions, the control unit 50 controls the throttle opening of the throttle valve 4 by controlling the throttle control unit 14, controls the fuel supply quantity (the fuel injection quantity) by controlling the fuel injectors 5, and controls the ignition timing of the spark plugs 6.

The control unit 50 of this example further controls the fuel injection timing to change over a combustion mode between a stratified charge combustion mode and a homogeneous charge combustion mode in accordance with the vehicle operating conditions. In a predetermined operating region such as low and medium load regions, the control unit 50 operates the engine in the stratified combustion mode by injecting fuel directly into the combustion chamber on the compression stroke so as to produce a stratified combustible air fuel mixture closely around the spark plug 6.

In another operating region such as a high load region above a predetermined engine load, the engine is operated in the homogeneous combustion mode. In the homogeneous combustion mode, fuel is injected on the intake stroke so as to produce a homogeneous air fuel mixture substantially homogeneous throughout the combustion chamber.

Figure 2:
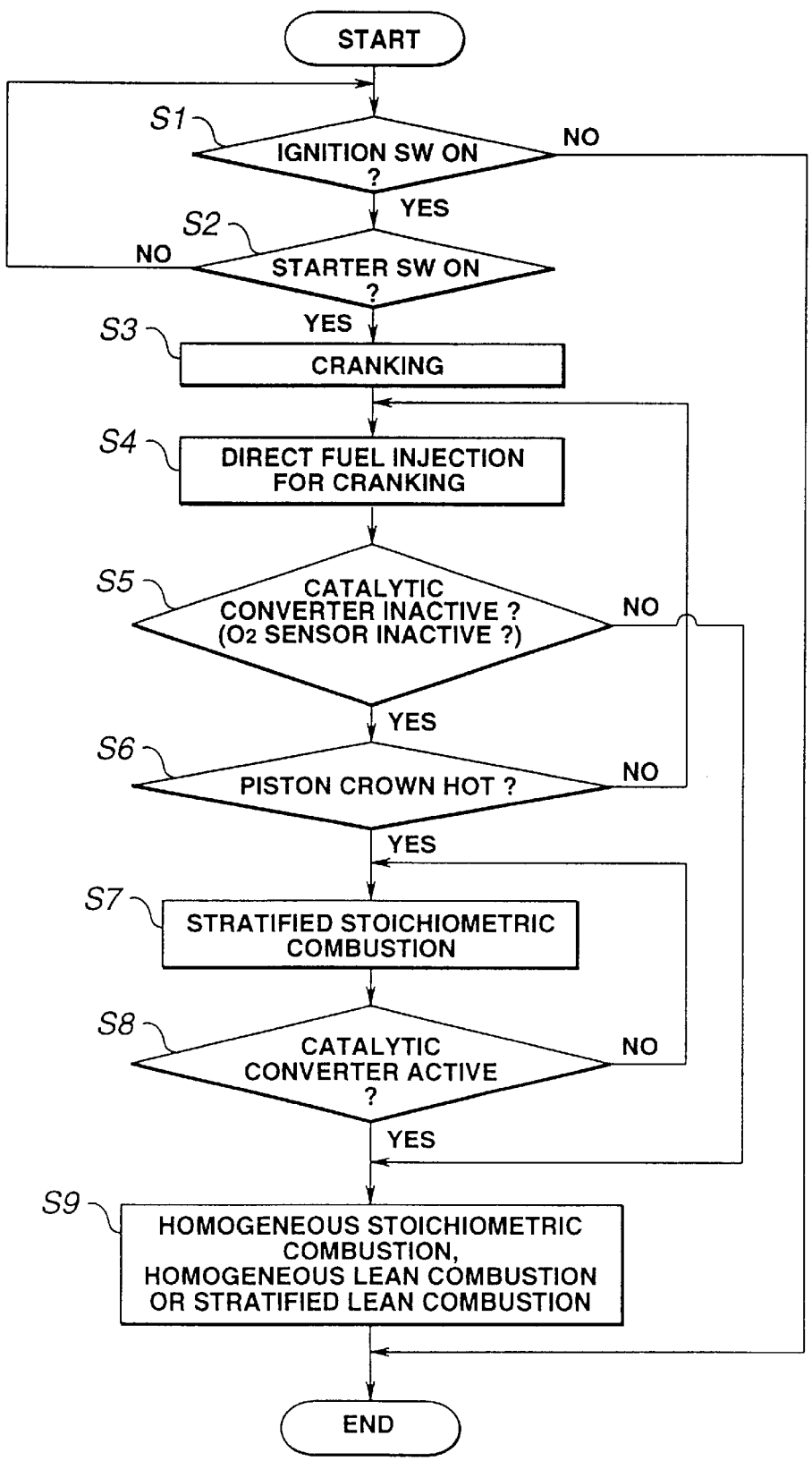
FIG. 2 is a flowchart showing a control process according to the first embodiment.

The control unit 50 according to this embodiment obtains various input signals from a vehicle key switch 16 and the sensors, and performs a control process shown in FIG. 2 to reduce HC emission during a period from an engine start to activation of the catalytic converter 9, and promote the activation of the catalytic converter 9. The control system of this example is configured to operate the engine 1 in a first stratified combustion mode (such as a stratified lean combustion mode) and a second stratified combustion mode at least. In the second stratified combustion mode in an illustrated practical example, the average air fuel ratio in the combustion chamber is set at an approximately stoichiometric ratio. Therefore, the second stratified combustion mode is referred to as a stratified stoichiometric charge combustion mode.

At a step S1 of FIG. 2, the control unit 50 checks whether an ignition signal of the key switch 16 turns on (i.e. whether a key is turned to an ignition on position). Then, the control unit 50 proceeds to a step S2 in the case of YES, and terminates this flow In the case of NO.

At the step S2, the control unit 50 checks whether a start signal of the key switch 16 turns on (i.e. whether the key is turned to a start position). Thus, the control unit 50 examines the existence or nonexistence of a request for cranking by a starter motor (not shown).

In the case of YES, the control unit 50 judges that there is a cranking request, and proceeds to a step S3. In the case of NO, the control unit 50 judges that there is no cranking request, and returns to the step S1.

At the step S3, the control unit 50 starts driving the starter motor and thereby cranks the engine 1.

Figure 7A:
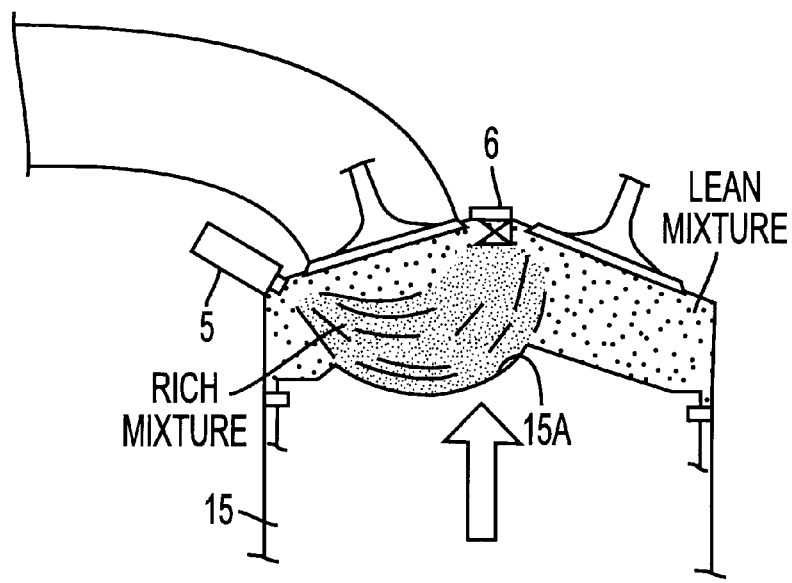
FIGS. 7A and 7B are schematic views for illustrating compression stroke direct cylinder fuel injection and intake stroke direct cylinder fuel injection, respectively.
Figure 7B:
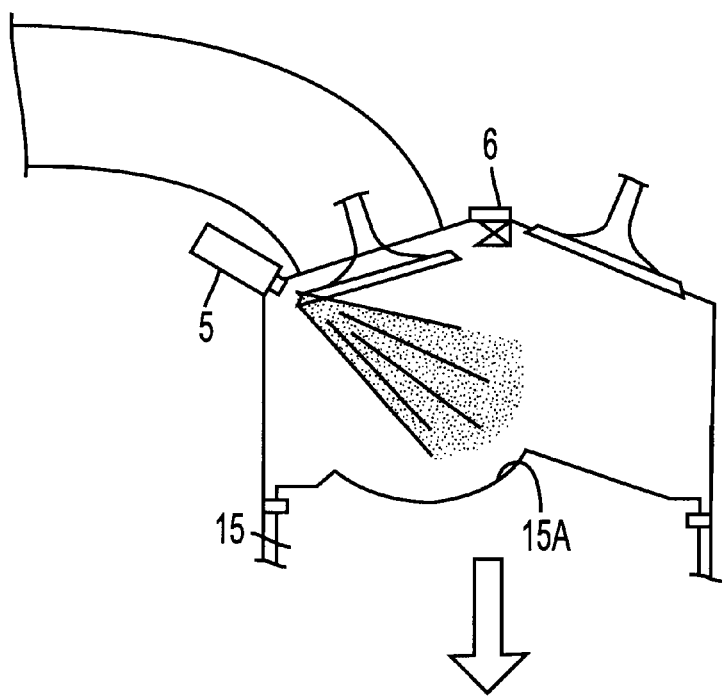

At a step S4, the control unit 50 commands the fuel injection system to perform fuel injection for starting (direct injection on the intake stroke, as shown in FIG. 7B), and operates the engine 1 (in the homogeneous combustion mode).

Figure 4:
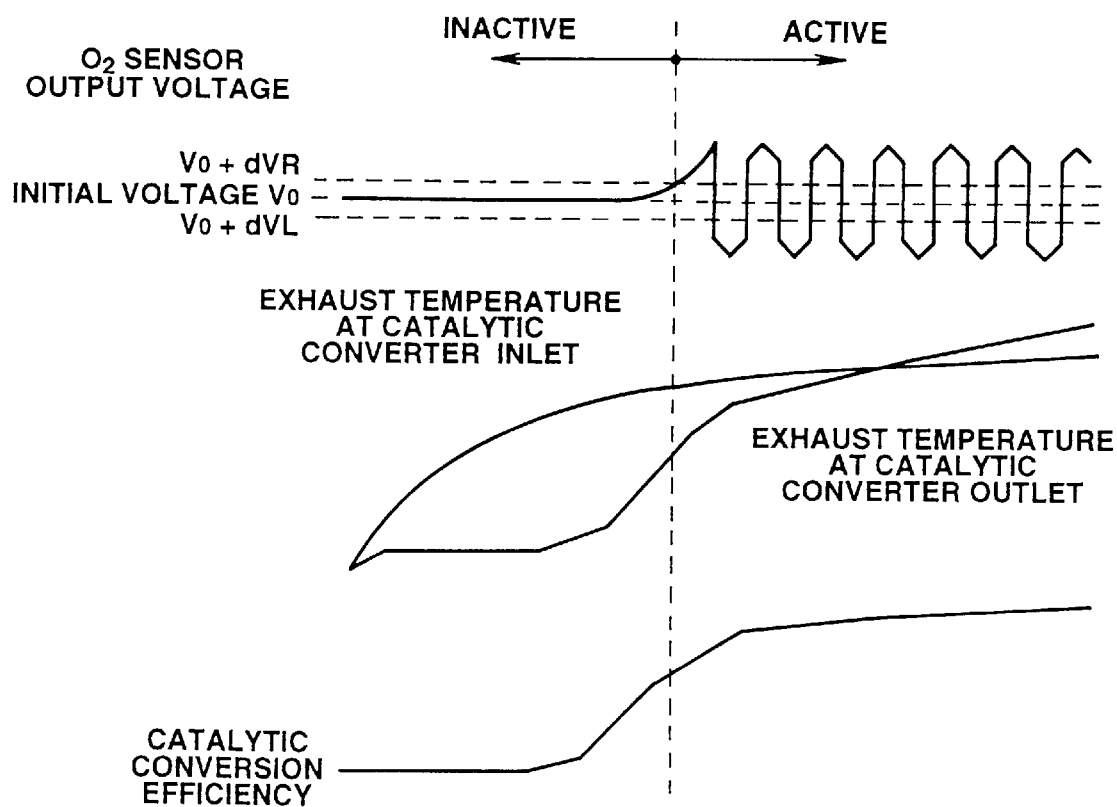
FIG. 4 is a timing chart for illustrating the activation check of FIG. 3.

At a next step S5, the control unit 50 checks whether the catalytic converter 9 is still in an inactive state. In this example, the control unit 50 performs this catalyst activation check by a process shown in FIG. 3. It is possible to check the activeness or inactiveness of the catalytic converter 9 by checking the activeness or inactiveness of the downstream side oxygen sensor 10 (at a step S12) as in the flow chart of FIG. 3. That is, the control unit 50 can judge the activeness or inactiveness of the catalytic converter 9 by monitoring behavior of the output signal of the downstream side oxygen sensor 10 as shown in FIG. 4.

Moreover, it is possible to judge the active or inactive condition of the catalytic converter 9 in dependence on the result of estimation of the temperature (or the outlet temperature) of the catalytic converter 9 based on detection of the engine cooling water temperature Tw or the oil temperature, or alternatively in dependence on the result of measurement of the temperature (or the outlet temperature) of the catalytic converter 9 with a temperature sensor.

When the catalytic converter 9 is not in the active state and hence the answer of the step S5 is YES, then the control unit 50 proceeds to a step S6.

When the catalytic converter 9 is in the active state and hence the answer of the step S5 is NO, then the control unit 50 proceeds to a step S9 and terminates the process of FIG. 2 on the assumption that there is no need for the catalyst activation control for promoting the activation of the catalytic converter 9. At the step S9, the control unit 50 controls the engine 1 in a normal combustion control mode to Improve the fuel economy and other engine performance in accordance with operating conditions.

At the step S6, the control unit 50 checks whether the temperature of the piston 15 (specifically, a surface temperature in a bowl 15A formed in the piston crown as shown in FIGS. 7A and 7B) is equal to or higher than a predetermined temperature (a temperature for permitting transition to stratified stoichiometric combustion). The decision step S6 can be performed by directly sensing the piston temperature with a thermocouple embedded in a predetermined portion (such as the piston crown) of the piston 15.

Alternatively, the control system can estimate the piston temperature from the sensed engine coolant temperature TW or the oil temperature, and determine the answer of the step S6 in accordance with the result of the estimation.

FIG. 5 shows a process of a piston temperature check based on a pseudo water temperature TWF correlated with the piston crown temperature. The control unit 50 determines the pseudo water temperature TWF by estimation as shown in FIG. 6, and examines whether the pseudo water temperature TWF is equal to or higher than a predetermined temperature TWF1 (stratified stoichiometric combustion permission temperature).

When the answer of the step S6 is YES, the control unit 50 judges that execution of the stratified stoichiometric combustion for promoting the catalyst activation would not impair ignitability, combustibility and hence engine stability (driveability), and proceeds to a step S7.

When the answer of the step S6 is NO, the control unit 50 judges there is a possibility that the piston crown temperature is too low to satisfactorily promote atomization and vaporization of the stratified air fuel mixture and that execution of the stratified stoichiometric combustion would lower the ignitability, combustibility and engine stability (driveability), and returns to the step S4 to inhibit transition to the stratified stoichiometric combustion and instead to continue the intake stroke direct injection (of the homogeneous charge combustion).

At the step S7, the control unit 50 permits transition to the stratified stoichiometric combustion and commands the actuating system inclusive of the fuel system to perform the stratified stoichiometric combustion since the condition of the catalytic converter 9 for requiring promotion of the catalyst activation and the condition of the piston crown temperature are both met.

In the stratified stoichiometric combustion mode, the air fuel ratio as a whole is set to be a desired ratio such as a ratio approximately equal to a stoichiometric ratio (theoretical air fuel ratio), and the fuel injection quantity per combustion cycle is set to a value corresponding to the desired ratio. In the example shown In FIG. 10A, the set quantity of fuel is injected in two portions, first on the intake stroke and then on the compression stroke.

In this example, the total per-cycle fuel quantity (by weight) required to achieve the most complete combustion of the fuel with the intake air quantity of the air per combustion cycle and to obtain an approximately stoichiometric air fuel ratio is divided into a first portion of about 50% to about 90% used for the intake stroke injection, and a second portion of about 50% to 10% for the compression stroke injection.

The first portion (about 50%~about 90%) of the total per-cycle fuel weight quantity is injected into the combustion chamber on the intake stroke so that a relatively lean (leaner-than-stoichiometric) homogeneous air fuel mixture is produced throughout the entirety of the combustion chamber. This intake stroke fuel injection is depicted in FIG. 7B.

The remaining about 50% to about 10% portion is injected on the compression stroke so as to produce a relatively rich (richer-than-stoichiometric) stratified air fuel mixture around the spark plug 6 as shown in FIG. 7A.

Figure 8:
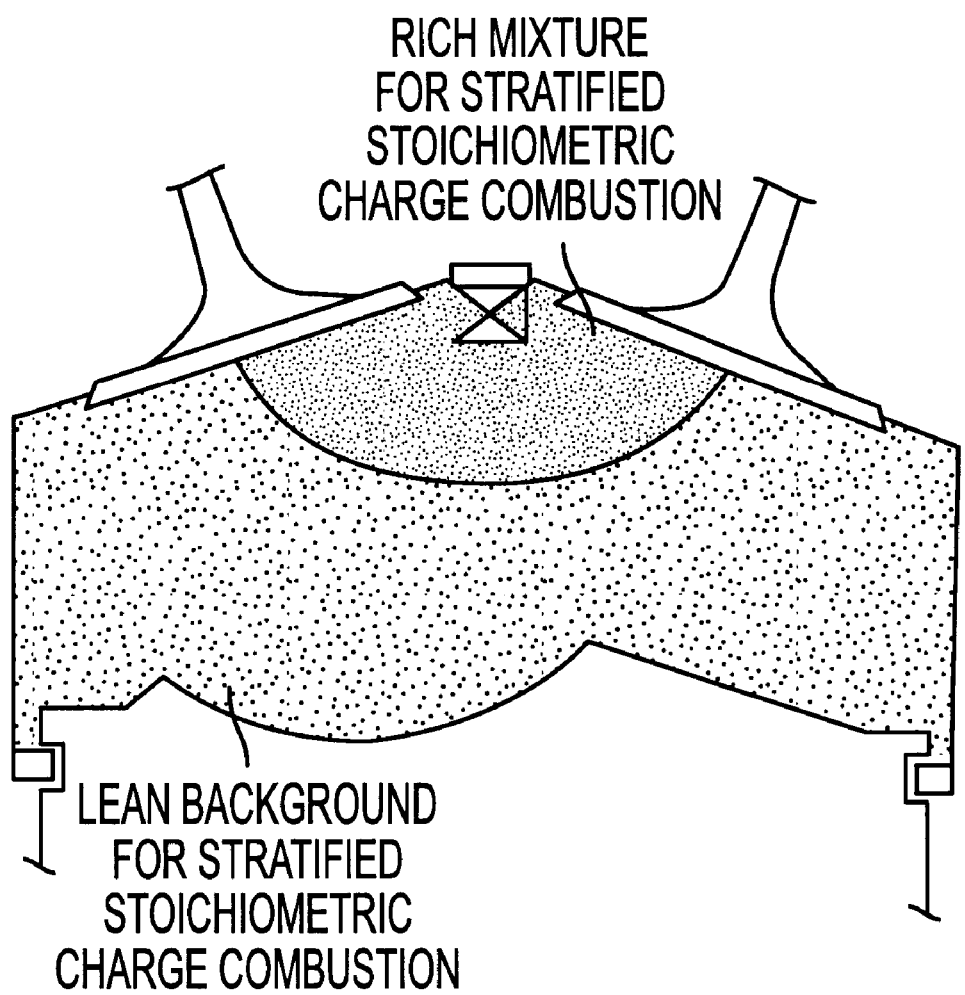
FIG. 8 is a schematic view for illustrating a stratified stoichiometric combustion mode achieved by the system of FIG. 1 by producing a relatively rich concentrated air fuel mixture region in a relatively lean air fuel mixture background region in a combustion chamber.

Then, combustion takes place in the combustion chamber in the state in which the richer region is formed around the spark plug 6, in the leaner background as shown in FIG. 8.

In this stratified stoichiometric combustion mode, the shares of the first and second portions may be so determined that the air fuel ratio of the leaner-than-stoichiometric background mixture produced in the combustion chamber during the intake stroke is 16~28, and that the air fuel ratio of the richer-than-stoichiometric mixture produced around the spark plug 6 by the injection on the compression stroke is 9~13. As long as the air fuel ratios of the mixture regions are set within these ranges, respectively, it is optional to set the average air fuel ratio in the combustion chamber at a value (within a range of 13.8 18, for example) slightly deviant from the theoretical ratio. The average ratio range of 13.8~18 is effective in keeping a balance between the amount of the product (CO) of incomplete combustion and the amount of oxygen left behind after the main combustion to effectively increase the temperature of the catalytic converter. Especially when the average air fuel ratio is set substantially equal to the stoichiometric ratio, the amounts of CO and residual oxygen are approximately equivalent and the temperature of the catalytic converter is increased very efficiently.

Figure 25:
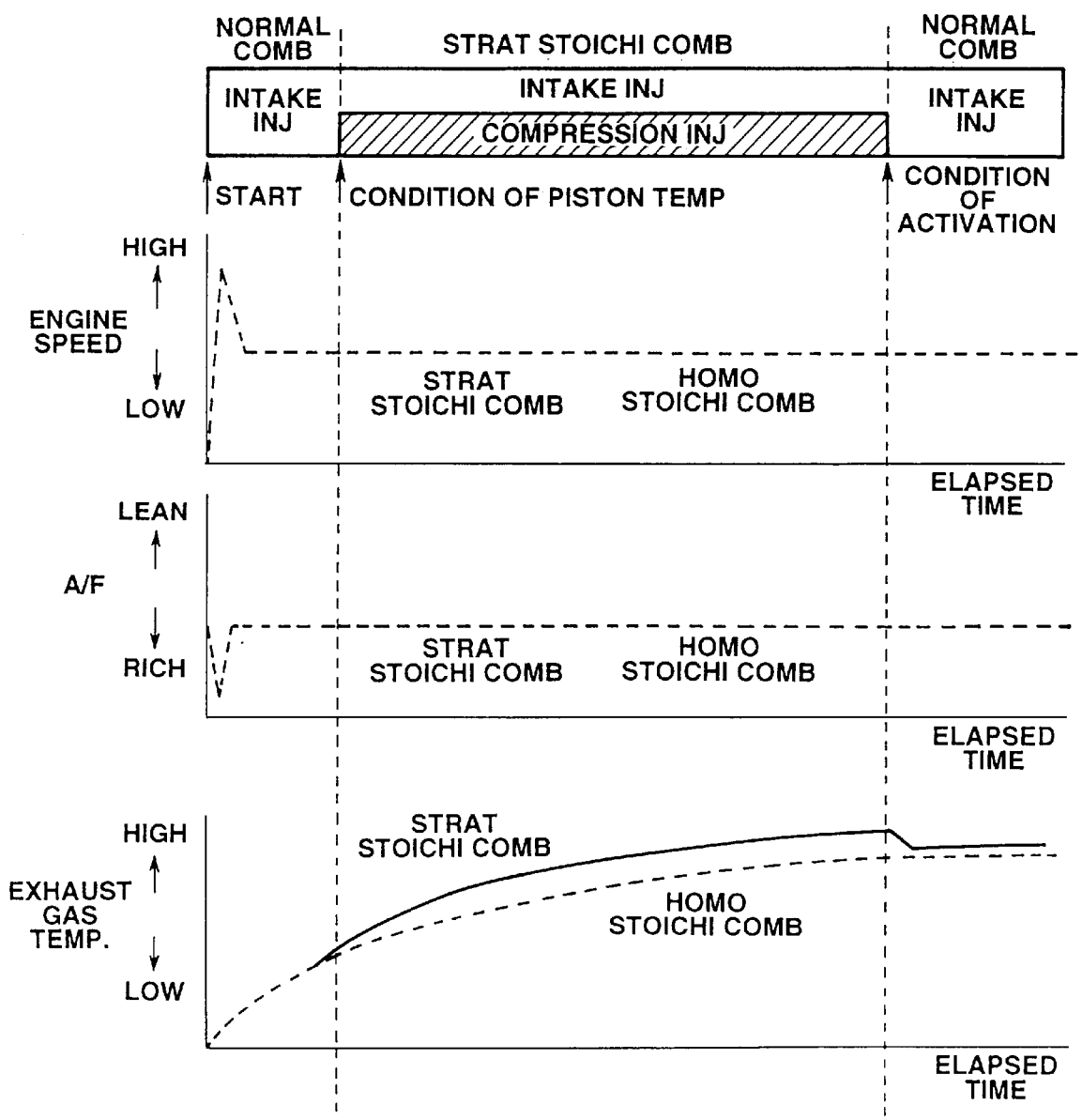
FIGS. 25 and 26 are timing charts for illustrating behaviors of the exhaust gas temperature and the composition of the exhaust gas mixture in the stratified stoichiometric charge combustion according to the present invention.
Figure 26:
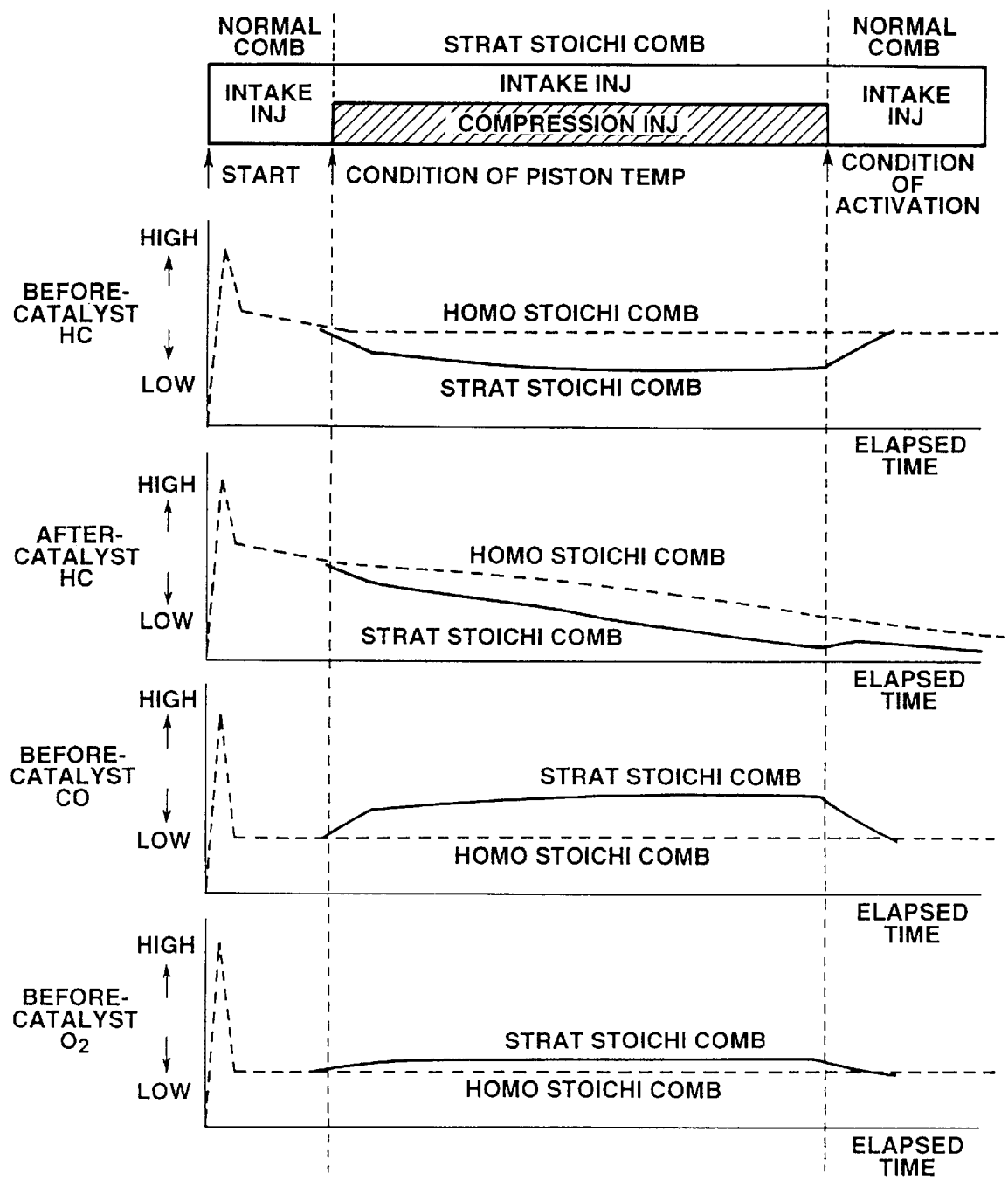

By the stratified stoichiometric combustion, the control system can increase the exhaust gas temperature as compared with the homogeneous stoichiometric combustion, and at the same time the control system can reduce the amount of unburned HC discharged from the combustion chamber to the exhaust passage (as shown in FIGS. 25 and 26). The ratio range of 9~13 is effective in increasing the exhaust temperature and reduce the unburned HC emission for various engines irrespective of engine type and displacement.

In this stratified stoichiometric charge combustion mode, the richer-than-stoichiometric air fuel mixture around the spark plug produces CO due to incomplete combustion during a process of main combustion (combustion by spark ignition and flame propagation), and the thus-produced carbon monoxide stays in the combustion chamber after the main combustion. On the other hand, oxygen is left in the lean background region around the richer-than-stoichiometric mixture region even after the main combustion. The remaining carbon monoxide and oxygen are mixed by the in-cylinder gas flow and re-burned, so that the exhaust gas temperature becomes high.

The product (CO) of the incomplete combustion produced in the process of the main combustion is already hot at the end of the main combustion. Therefore, the product (CO) of the incomplete combustion is readily combustible even when the temperature in the combustion chamber is still low. The carbon monoxide produced by the incomplete combustion is very likely to undergo recombustion almost entirely in the combustion chamber or in the exhaust passage section on the upstream side of the catalytic converter. As compared with the homogeneous combustion in which the main combustion produces a less amount of CO, the stratified stoichiometric combustion might increase the amount of CO flowing into the catalytic converter. However, the catalytic converter can start the conversion of CO at a lower temperature than the conversion of HC, so that the influence on the exhaust emission is relatively small.

Moreover, this control system can ensure stable ignition, and stable generation of CO by using the rich air fuel mixture superior in ignitability to a stoichiometric mixture, and elongating the time for atomization of injected fuel sufficiently. With the well atomized fuel, this control system can reduce the generation of unburned HC in the rich mixture region.

The lean background mixture region has an air fuel ratio enabling flame propagation. Therefore, this system does not produce unburned HC in the interface between the rich concentrated region and the lean background region. Thorough propagation of flame over the combustion chamber reduces a low temperature region (quenched region) to a sufficiently small extent as in the homogeneous combustion. During the process of atomization, diffusion takes place simultaneously and tends to make the periphery of the rich region partially lean to a level disabling flame propagation. The lean background produced prior to the compression stroke fuel injection acts to protect the periphery of the rich region against enleanment due to the diffusion. Consequently, this system can reduce the amount of HC generated by the main combustion to a level approximately equal to the level of the homogeneous combustion, and moreover this system can further reduce the amount of HC flowing into the catalytic converter by re-combustion of unburned HC occurring simultaneously with re-combustion of CO. The lean background region acts to leave behind an excess of oxygen after the main combustion. At the end of the main combustion, the residual oxygen in the lean region is so hot as to promote the re-combustion of CO.

FIGS. 25 and 26 illustrates effects of the stratified stoichiometric combustion. In FIGS. 25 and 26, the stratified stoichiometric combustion is abbreviated to "strat stoichi comb", and the homogeneous stoichiometric combustion to "homo stoichi comb". As shown in FIGS. 25 and 26, the stratified stoichiometric combustion can reduce the amount of HC generated by combustion and increase the amount of CO. Thus, this system can increase the percentage of CO in the in-cylinder gases (burnt gas mixture) and decrease the percentage of HC.

In this way, the stratified stoichiometric combustion mode can reduce the amount of HC emission during a warm up period from a start of the engine to activation of the catalytic converter 9, and significantly promote the activation of the catalytic converter 9 as compared with the simple homogeneous combustion, the simple stratified combustion or the combustion mode utilizing the additional fuel injection on or after the latter stage of the combustion (on or after the expansion stroke or on the exhaust stroke).

At a step S8, the control unit 50 checks whether the catalytic converter 9 is activated (the warm up operation is finished) or not, in the same manner as the step S5 (by the flowchart of FIG. 3). The control unit 50 proceeds to a step S9 when the catalytic converter 9 is in the activated state and the answer of the step S8 is YES. When the answer of the step S8 is NO, the control unit 50 returns to the step S7 and thereby continues the stratified stoichiometric combustion until the catalytic converter 9 becomes activated.

At the step S9, the control unit 50 converts the combustion control mode to a normal combustion mode (such as homogeneous stoichiometric combustion mode, homogeneous lean combustion mode, and stratified lean combustion mode) to achieve desired emission performance, fuel efficiency or driveability (such as output performance and stability) in accordance with operating conditions, and then terminates the program of FIG. 2.

Thus, by performing the stratified stoichiometric combustion during warm-up process, the control system according to this embodiment can reduce the HC emission to the atmosphere during a period from engine start to activation of the catalytic emission control device 9, and at the same time promote the activation of the catalytic device 9 (as shown in FIGS. 25 and 26).

In an engine operating state which may possibly affect the combustibility of the stratified stoichiometric combustion adversely (such as the state in which the piston crown temperature is lower than a predetermined temperature), the control system of this example inhibits conversion to the stratified stoichiometric combustion. Thus, the control system of this example can give higher priority to the engine stability (engine driveability) over quick activation of the catalytic converter 9. When the activation of the catalytic converter 9 is to take higher priority, it is possible to omit this arrangement (that is, by omitting the step S6 in the flowchart of FIG. 2).

The control system of this example terminates the stratified stoichiometric combustion and starts a fuel-efficient combustion mode (such as the stratified leans combustion, the homogeneous stoichiometric combustion and the homogeneous lean combustion) immediately after the catalytic converter 9 becomes active, so that the system can improve the fuel economy.

FIG. 3 shows the process of the catalytic converter activation check of the step S5, and FIG. 4 is a timing chart for illustrating this catalytic converter activity check.

At a step S11, the control unit 50 examines whether the downstream side oxygen sensor 10 is in a non-heating mode in which the heating operation by a heater is not performed. If the answer is NO (that is, if the heater is in heating operation), then the control unit 50 terminates the process of FIG. 3 since the heating operation is so influential as to increase error in the activity check of the downstream side oxygen sensor 10 and the activation check of the catalytic converter 9. If the answer of the step S11 is YES (the heater of the downstream side oxygen sensor 10 is out of heating operation), the control unit 50 proceeds to a step 512 on the assumption that the activation check of the oxygen sensor 10 and hence the activation check of the catalytic converter 9 can be done accurately enough.

The step S12 is a step for checking if the downstream side oxygen sensor 10 is in an active state or not. In this example, the control unit 50 determines whether the downstream side oxygen sensor 10 is activated, by monitoring the output voltage of the downstream side oxygen sensor 10. As shown in FIG. 4, the control unit 50 can determine whether the downstream side oxygen sensor 10 is in the activated state, by checking if the oxygen sensor output voltage of the oxygen sensor 10 becomes equal to a predetermined level (V0+dVR) from a state in which the oxygen sensor output voltage is held equal to an initial voltage V0. Conversely, the control unit 50 can check if the oxygen sensor output voltage of the oxygen sensor 10 becomes equal to a predetermined level (V0+dVL) from the initial voltage V0, to determine the activeness or inactiveness of the downstream side oxygen sensor 10. Moreover, it is possible to monitor the number of rich-lean reversals of the output voltage of the oxygen sensor 10, and to determine the activeness or inactiveness of the oxygen sensor 10, by examining whether the number of rich-lean reversals becomes equal to a predetermined number.

From the step S12, the control unit 50 proceeds to a step S13 when the answer of the step S12 is YES. When the answer is NO, the control unit 50 repeats the step S12 until the activeness of the oxygen sensor 10 is confirmed by the step S12.

At the step S13, the control unit 50 concludes that the catalytic converter 9 becomes activated. This conclusion (or inference) is based on the assumption that the activation of the oxygen sensor 10 located on the downstream side of the catalytic converter 9 is due to an increase of the exhaust gas temperature on the outlet side of the catalytic converter 9 (by oxidizing reaction).

At a next step S14, the control unit 50 starts a heater control for energizing the heater of the downstream side oxygen sensor 10 (to hold the temperature of the oxygen sensor 10 at a predetermined temperature), and then terminates the process of FIG. 3.

For the piston crown temperature check of the step S6, the control unit 50 of this example performs the process of FIG. 5 in the following manner.

Figure 6A:
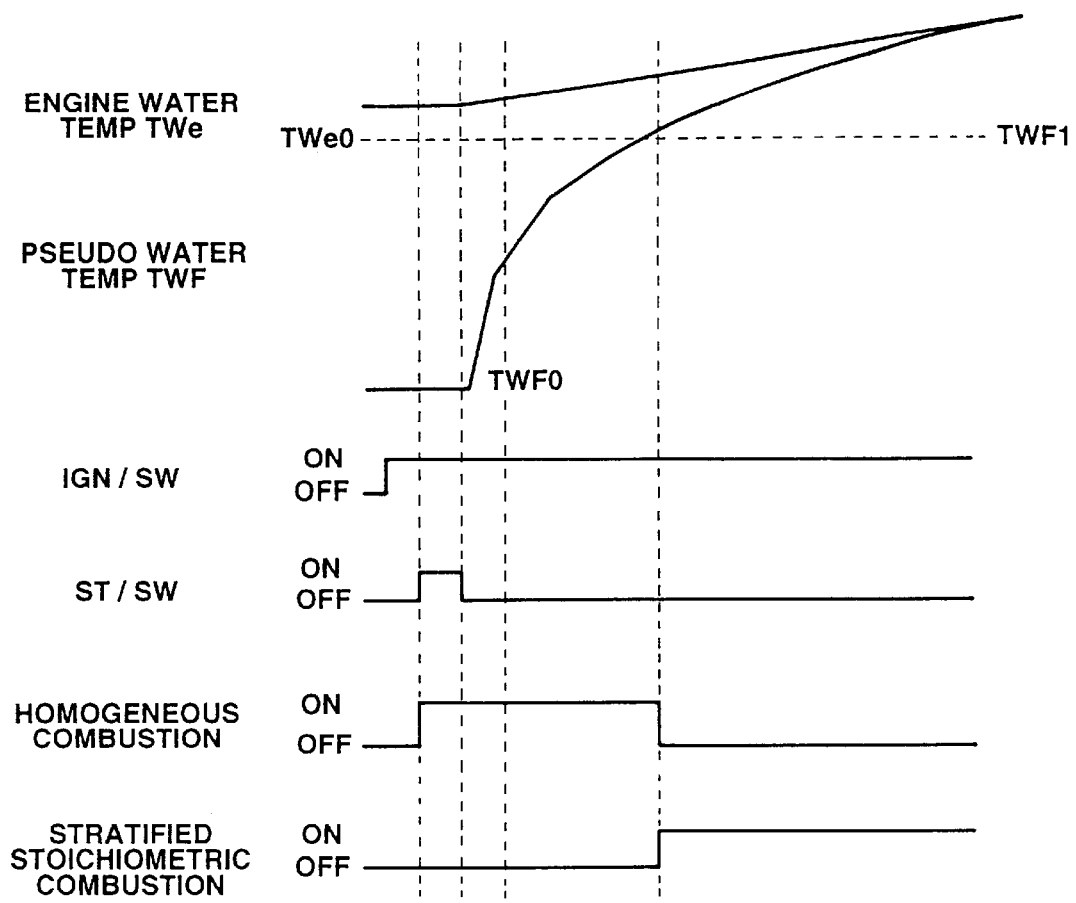
FIG. 6A is a timing chart for illustrating the piston temperature check of FIG. 5.
Figure 6B:
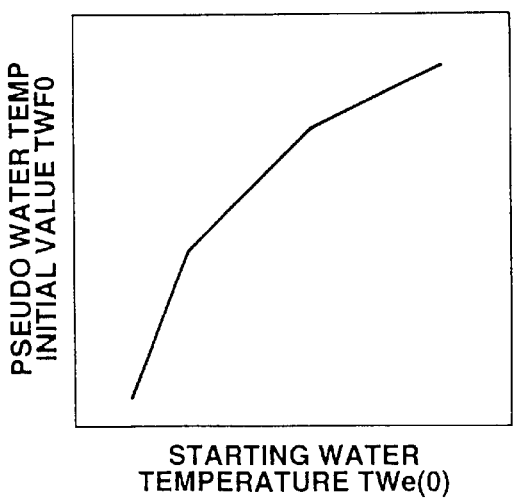
FIGS. 6B and 6C are graphs showing parameters for determining a pseudo engine coolant temperature used in the piston temperature check of FIG. 5.
Figure 6C:
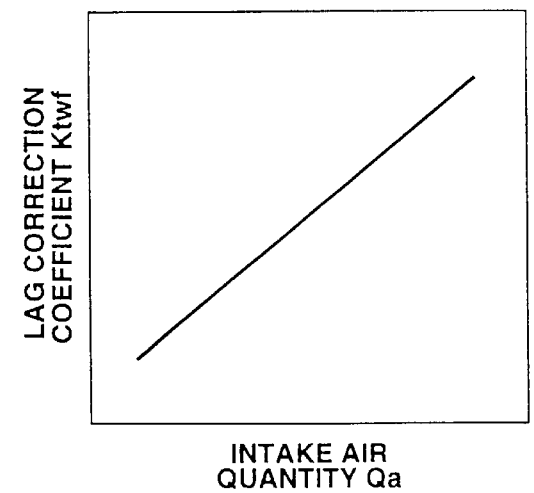

At a step 21 of FIG. 5, the control unit 50 estimates the pseudo water temperature TWF[t] (t is a time elapsed after the ignition signal turns ON) correlated with the piston crown temperature by a method as shown in FIGS. 6A, 6B and 6C, and examines if the estimated pseudo water temperature TWF[t] is equal to or higher than the predetermined temperature TWF1.

As shown in FIG. 6A, the pseudo water temperature TWF starts from an initial pseudo temperature (pseudo water temperature initial value) TWF0 determined in accordance with an initial value TWe0 (starting water temperature) of the engine cooling water temperature at an engine start as shown in FIG. 6B, and increases so as to converge toward the engine cooling water temperature TWe, in a pace of first order lag by an amount per unit time. The amount per unit time by which the pseudo water temperature TWF increases every unit time is equal to a lag correction coefficient Ktwf determined by the intake air quantity Qa, as shown in FIG. 6C.

$$TWF[t]=TWe[t]-(TWe[t]-TWF[t-1])\times(1-Ktwf)$$

In this equation, TWF[0]=TWe[0], and t is a time elapsed from an ignition switch on operation (IGN/SW-ON). In this example, the initial value TWF0 of the pseudo water temperature is determined in accordance with the water temperature TWe0 at engine start, by looking up a table as shown in FIG. 6B, and the lag correction coefficient Ktwf is determined in accordance with the intake air quantity by looking up a table as shown in FIG. 6C. In the example shown in FIG. 6B, TWF0 increases monotonically with increase in TWe0. The lag correction coefficient Ktwf increases monotonically with increase in Qa, and more specifically Ktwf increases linearly with Qa in the example shown in FIG. 6C.

From the step S21, the control unit 50 proceeds to a step S22 when the answer of the step S21 is YES (TWF[t] ≧TWF1), and returns to the step S21 when the answer is NO.

At the step S22, the control unit 50 concludes that the piston crown temperature is equal to or higher than the predetermined temperature, and hence hot enough to permit the stratified stoichiometric combustion, and then terminates the flow of FIG. 5.

In the stratified stoichiometric combustion mode, the fuel is supplied by a first injection during the intake stroke and a second injection during the compression stroke. In this example, the control unit 50 sets the fuel injection quantity and fuel injection timing for each of the first and second injections in the following manner.

When the stratified stoichiometric combustion is not performed, the fuel injection quantity is determined in the following manner.

A base fuel injection pulse width (corresponding to a base fuel injection quantity) Tpt=c×Qa/Ne is determined from the intake air quantity Qa determined from the voltage signal of the air flowmeter 3 and the engine revolution speed Ne determined from the signal from the crank angle sensor 11 (where c is a constant). The base fuel injection pulse width Tpt is modified by a plurality of correction factors Kw, Kas, LAMD, Z etc., to determine an effective fuel injection pulse width CTI:

$$CTI=Tpt\times(1+Kw+Kas+\ldots)\times LAMD\times Z+Ts$$

Among the correction factors, Kw is a water temperature correction factor Kw for fuel enrichment to maintain the engine stability when the engine cooling water temperature is low, Kas is an enrichment correction factor for engine cranking and an after-start operation after an engine start, LAMD is an air fuel ratio feedback correction factor, and Z is a target air fuel ratio correction factor. Ts is a voltage correction quantity. By increasing or decreasing the feedback correction factor LAMD in accordance with the result of the air fuel ratio measurement by the air fuel ratio sensor 8 on the upstream side of the catalytic converter 9 according to a control law such as a proportional-plus-integral (PI) control law, the control unit 50 corrects the base fuel injection pulse width Tpt and controls the actual air fuel ratio of the air fuel mixture for the engine in a feedback control manner to reduce a deviation of the actual air fuel ratio from a desired target air fuel ratio. When the feedback air fuel ratio control is not performed (in the stratified stoichiometric combustion mode, for example), the feedback correction factor LAMD is clamped (or fixed) at a predetermined fixed value (1.0, for example).

In the case of the stratified stoichiometric combustion mode, the effective fuel injection pulse width CTI is divided into a first portion CTIH=CTI×Ksp for the intake stroke injection, and a second portion CTIS=CTI×(1−Ksp) for the compression stroke injection (where Ksp is a division ratio or share ratio).

The division ratio Ksp may be a fixed value. Preferably, however, the division ratio Ksp is a variable determined in accordance with an operating condition. In this example, the division ratio Ksp is so determined that the total fuel quantity (by weight) required to achieve the most complete (substantially stoichiometric) combustion of the fuel with the intake air quantity is divided into the first portion of about 50% to about 90% used for the intake stroke injection, and the second portion of about 50% to about 10% for the compression stroke injection.

The division ratio Ksp may be so determined that the air fuel ratio of the leaner-than-stoichiometric background mixture produced in the combustion chamber during the intake stroke is 16~28, and that the air fuel ratio of the richer-than-stoichiometric mixture produced around the spark plug 6 by the injection on the compression stroke is 9~13.

Figure 9:
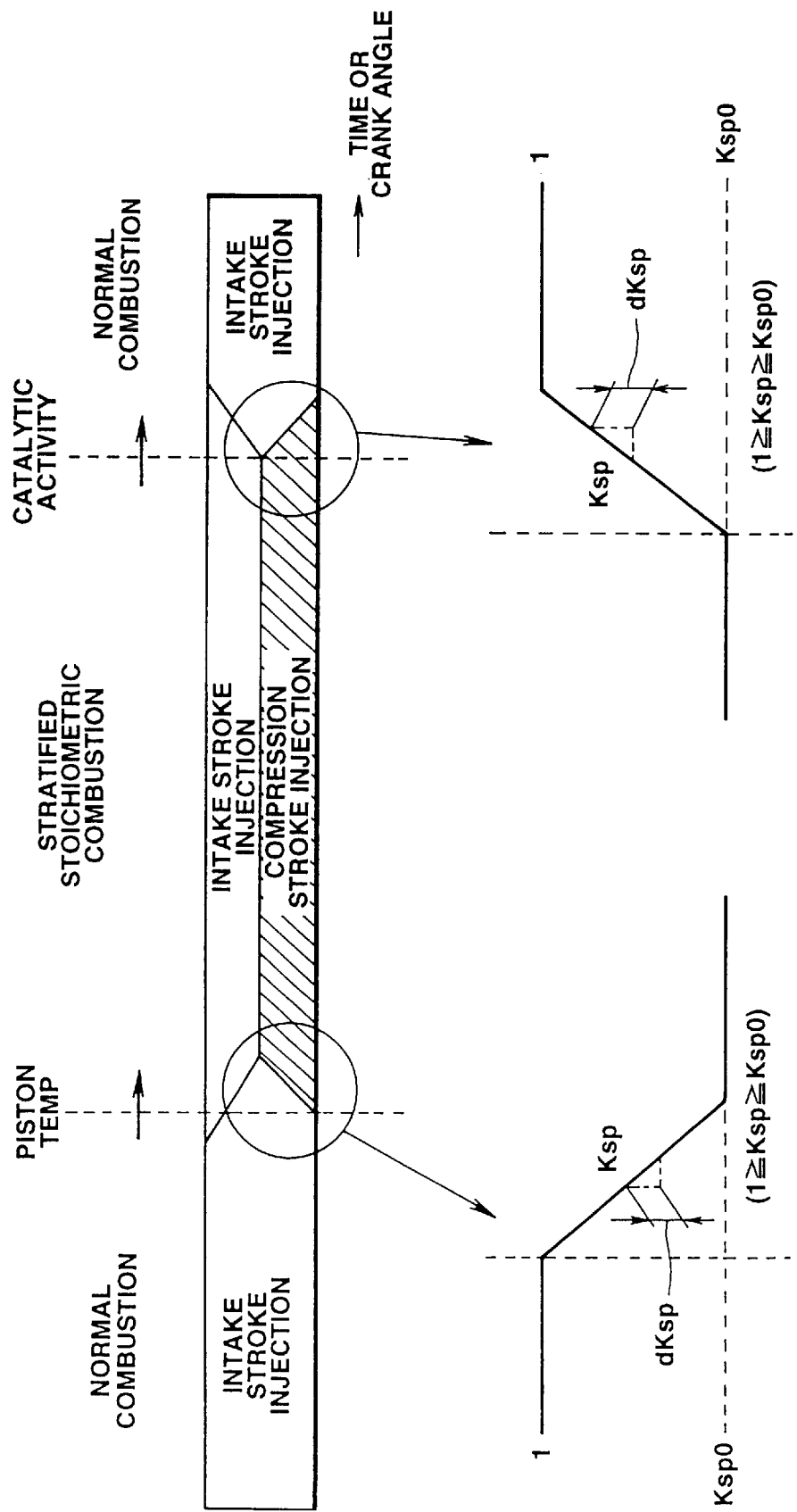
FIG. 9 is a view for illustrating a division ratio Ksp determined by the controller of FIG. 1 to determine the shares of the intake stroke fuel injection and the compression stroke fuel injection.

When the combustion mode is changed between the stratified stoichiometric mode and the normal combustion mode (such as the homogeneous stoichiometric mode, the homogeneous lean mode and the stratified lean mode), the control unit 50 of this example varies the division ratio Ksp gradually as shown in FIG. 9, so that the control system can achieve a smooth and gradual combustion changeover without a undesired abrupt change of the output and ensure the satisfactory driveability. In the case of a changeover from the normal combustion mode to the stratified stoichiometric combustion mode, the division ratio Ksp is decreased from 1 to Ksp0 in such a gradual manner that a small amount dKsp is decreased for each unit time interval (10 msec, for example) after a decision to permit the stratified stoichiometric mode. In the case of a changeover from the stratified stoichiometric combustion mode to the normal combustion mode, the division ratio Ksp is increased from Ksp0 to 1 in such a gradual manner that the small amount dKsp is increased for each unit time interval after a decision to terminate the stratified stoichiometric mode.

Figure 10A:
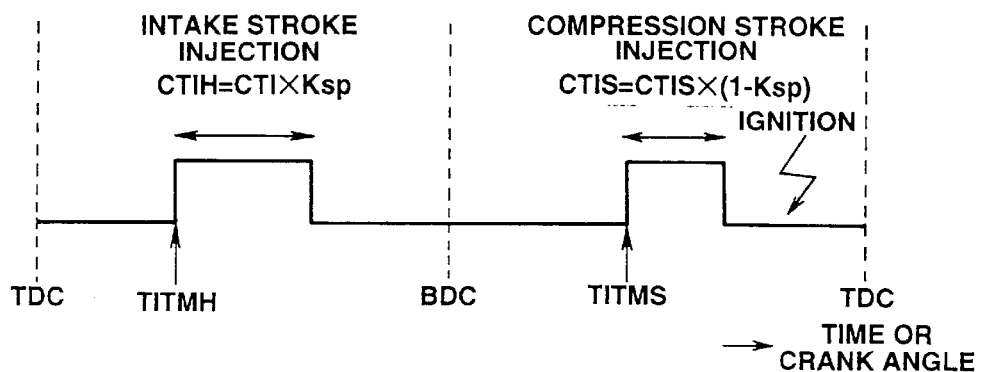
FIG. 10A is a chart for illustrating the timings of the intake stroke fuel injection and the compression stroke fuel injection performed by the system of FIG. 1 as well as the ignition timing.
Figure 10B:
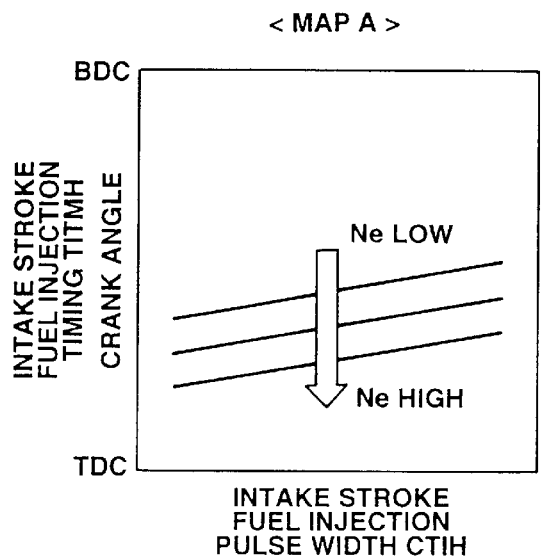
FIGS. 10B and 10C are graphs of maps used by the system of FIG. 1 to determine the timings of the intake stroke fuel injection and the compression stroke fuel injection.
Figure 10C:
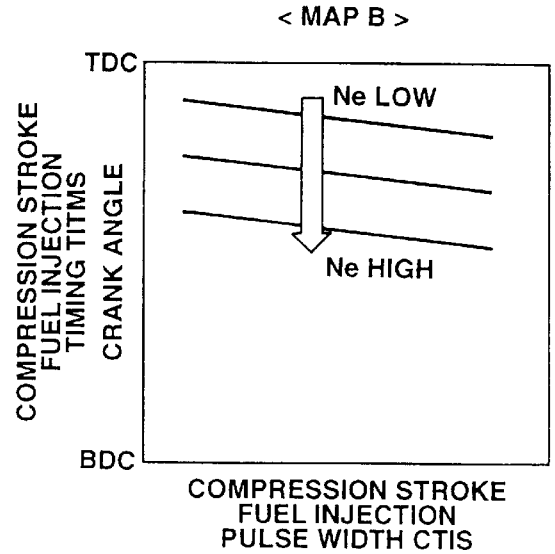

In the stratified stoichiometric combustion mode, the control unit 50 determines an intake stroke fuel injection timing TITMH shown in FIG. 10A in accordance with the engine speed Ne and the intake stroke fuel injection pulse width CTIH (as shown in a map A of FIG. 10B), and a compression stroke fuel injection timing TITMS in accordance with the engine speed Ne and the compression stroke fuel injection pulse width CTIS (as shown in a map B of FIG. 10C). The setting of the compression stroke fuel injection timing TITMS is such that the compression stroke fuel injection timing TITMS is advanced with respect to the fuel injection timing of the stratified lean combustion mode.

Figure 11:
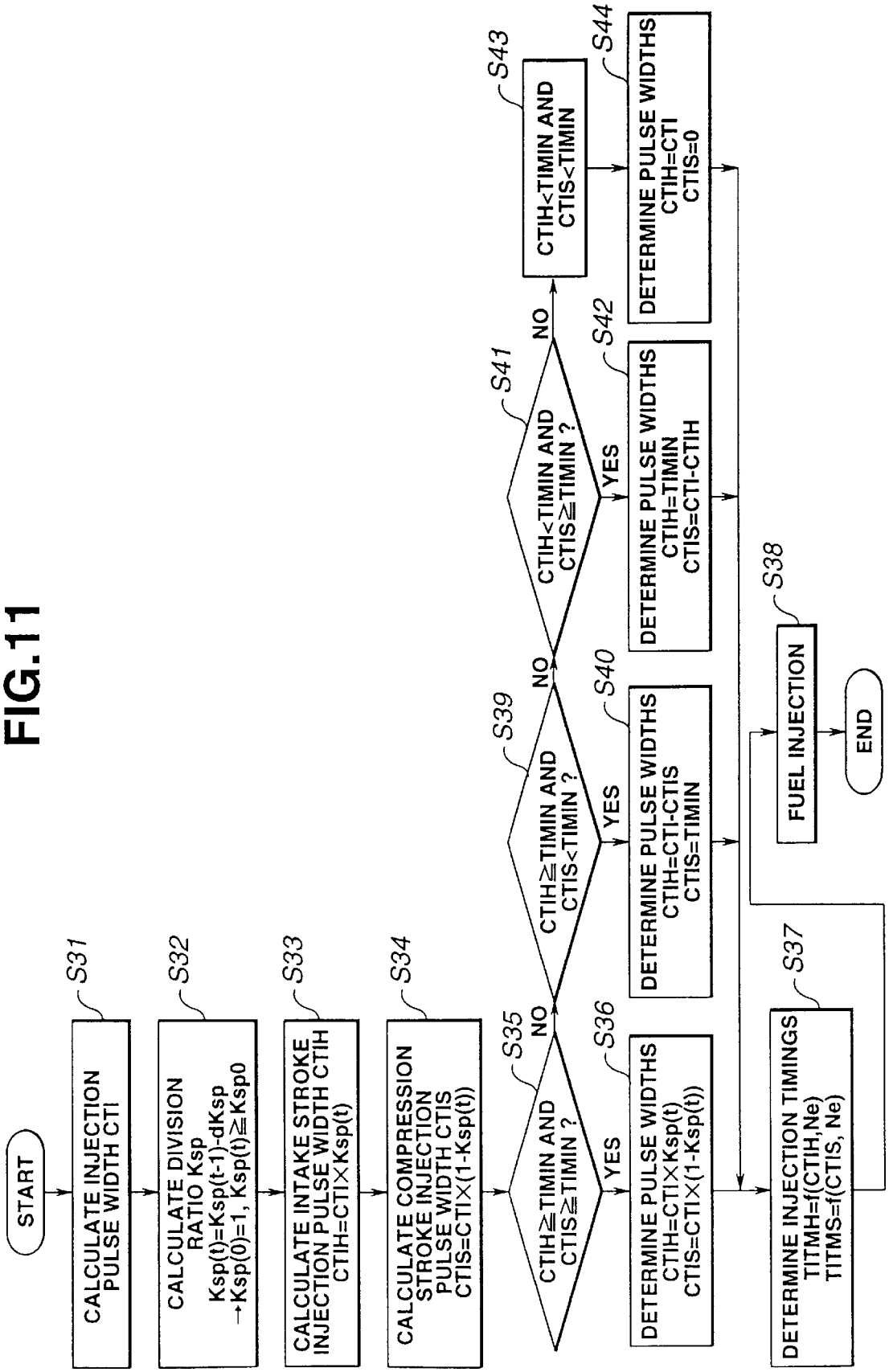
FIG. 11 is a flowchart showing a process for the system of FIG. 1 to determine fuel injection pulse widths and timings of the intake stroke fuel injection and the compression stroke fuel injection.

FIG. 11 shows a control process for controlling the fuel injection quantities and the fuel injection timings.

At a step S31, the control unit 50 calculates the fuel injection pulse width CTI as mentioned before.

At a step S32, the control unit 50 calculates the division ratio Ksp(t) according to the following equation.

$$Ksp(t)=Ksp(t-1)-dKsp$$

In this equation, $Ksp(0)=0$, $Ksp(t) \geq Ksp0$, $Ksp(t)$ is a (most recent) current value of the division ratio Ksp, $Ksp(t-1)$ is a previous value of the division ratio Ksp, and t is a number of execution cycles of this routine performed at regular time intervals ($t \geq 1$). By this calculation, the division ratio Ksp(t) is decreased from 1, by dKsp in each period of the unit time (10 msec, for example) until Ksp0 is reached.

At a step S33, the control unit 50 calculates the intake stroke fuel injection pulse width CTIH according to the following equation.

$$CTIH=CTI \times Ksp(t)$$

At a step S34, the control unit 50 calculates the compression stroke fuel injection pulse width CTIS according to the following equation.

$$CTIS=CTI \times \{1-Ksp(t)\}$$

At a step S35, the control unit 50 determines the existence or nonexistence of a predetermined condition for permitting fuel injections with the fuel injection pulse widths calculated at the steps 33 and 34. In a low flow rate region, there is a possibility of deteriorating the combustion stability (driveability), the emission performance and the fuel efficiency because of the existence of a nonlinear region in which the fuel injection characteristic of the fuel injector is not linear (so that the actual fuel injection quantity is not uniquely determined by the pulse width). The step S35 is designed to avoid this undesired possibility.

In this example, the control unit 50 compares each of the fuel injection pulse widths CTIH and CTIS with a minimum fuel injection pulse width TIMIN representing a limit of a linear region. At the step S35, the control unit 50 examines whether $CTIH \geq TIMIN$ and at the same time $CTIS \geq TIMIN$. The control unit 50 proceeds to a step 536 in the case of YES, and to a step S39 in the case of NO.

At the step S36, the control unit 50 fixes the pulse widths CTIH and CTIS calculated at the step 33 and 34 as final pulse widths CTIH and CTIS.

At a next step S37, the control unit 50 determines the intake stroke fuel injection timing TITMH and the compression stroke fuel injection timing TITMS by using the following equations.

$$TITMH=f(CTIH, Ne)$$

$$TITMS=f(CTIS, Ne)$$

In this example, the fuel injection timings TITMH and TITMS are determined by looking up the maps A and B shown in FIGS. 10B and 10C.

At a next step S38, the control unit 50 sends a first fuel injection drive pulse signal of the pulse width TITMH at the injection timing TITMH and a second fuel injection drive pulse signal of the pulse width TITMS at the injection timing TITMS, to the fuel injector 5, and thereby commands the fuel injector 5 to carry out the intake stroke direct fuel injection and the compression stroke direct fuel injection. Then, the control unit 50 terminates this control flow.

The step S39 is reached when the answer of the step S35 is NO. At the step S39, the control unit 50 determines whether $CTIH \geq TIMIN$ and $CTIS<TIMIN$. The control unit 50 proceeds to a step S40 in the case of YES, and to a step S41 in the case of NO.

When $CTIS<TIMIN$, the control unit 50, at the step S40, considers that the injection pulse width CTIS is too small to achieve an allowable fuel injection performance, and finally determines the fuel injection pulse widths CTIH and CTIS by setting CTIS equal to the minimum fuel injection pulse width (injection quantity) TIMIN to ensure the minimum flow rate, and adjusting the fuel injection pulse width CTIH to hold the total fuel injection quantity CTI unchanged.

$$CTIH=CTI-CTIS$$

$$CTIS=TIMIN$$

Then, the control unit 50 proceeds to the steps S37 and S38 and determines the fuel injection timings and commands the fuel system to carry out the intake stroke fuel injection and the compression stroke injection of the stratified stoichiometric mode.

At the step S41, the control unit 50 determines whether $CTIH<TIMIN$ and at the same time $CTIS \geq TIMIN$. The control unit 50 proceeds to a step S42 in the case of YES, and to a step S42 in the case of NO.

When $CTIH<TIMIN$, the control unit 50 considers, at the step S42, that the injection pulse width CTIH is too small to achieve an allowable fuel injection performance, and finalizes the fuel injection pulse widths CTIH and CTIS by setting CTIH equal to the minimum fuel injection pulse width (injection quantity) TIMIN to ensure the minimum flow rate, and adjusting the fuel injection pulse width CTIS to hold the total fuel injection quantity CTI unchanged.

$$CTIH=TIMIN$$

$$CTIS=CTI-CTIH$$

Then, the control unit 50 proceeds to the steps S37 and S38 and determines the fuel injection timings and commands the fuel system to carry out the intake stroke fuel injection and the compression stroke injection of the stratified stoichiometric mode.

At the step S43, the control unit 50 judges that $CTIH<TIMIN$ and at the same time $CTIS<TIMIN$, and this condition is inappropriate to perform both the intake stroke fuel injection and the compression stroke fuel injection, and therefore proceeds to a step S44 to inhibit the compression stroke fuel injection and to allow only the intake stroke fuel injection.

At the step S44, the control unit 50 finalizes the fuel injection pulses CTIH and CTIS as follows:

$$CTIH=CTI$$

$$CTIS=0$$

Then, the control unit 50 proceeds to the steps S37 and S38, determines the fuel injection timing for the intake stroke injection, and commands the fuel system to carry out the intake stroke fuel injection.

As to the ignition timing, the control system can control the ignition timing according to a technique of MBT (Minimum Spark Advance of Best Torque).

The control system according to this embodiment can ensure stable fuel injecting performance (exempt from irregular or unstable injection) to the advantage of emission control, fuel economy and driveability, by setting the lower limit of the minimum fuel injection quantity TIMIN for each open period of the fuel injector 5.

Figure 12:
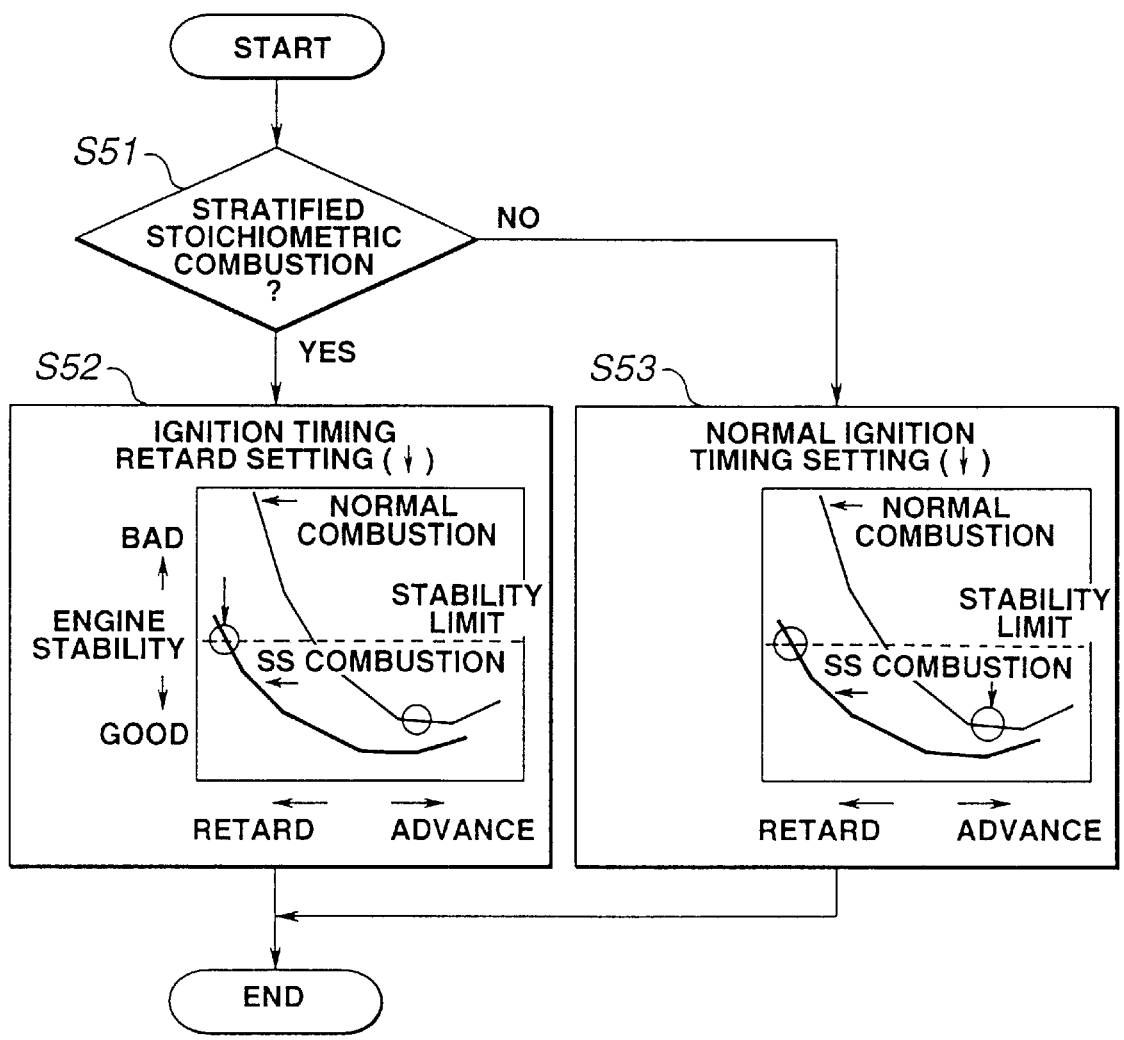
FIG. 12 is a flowchart showing an ignition timing control process performed by a system according to a second embodiment.

FIG. 12 shows an ignition timing control process performed by a control system according to a second embodiment of the present invention. The control system according to the second embodiment performs the stratified stoichiometric combustion to Improve the warmup operation as in the first embodiment. Moreover, the control system of the second embodiment is arranged to control the ignition timing during the stratified stoichiometric combustion mode, to further increase the exhaust temperature during the warm-up process, to further reduce the HC emission to the atmosphere during the activation process of the catalytic converter 9, and to further quicken the activation process of the catalytic converter 9. The control system according to the second embodiment is constructed as shown in FIG. 1, and arranged to perform the control flows shown in FIGS. 2, 3, 5 and 11 as in the first embodiment.

The control unit 50 according to the second embodiment controls the ignition timing in the retard direction during the stratified stoichiometric combustion by following the control flow shown in FIG. 12.

At a step S51, the control unit 50 determines whether the stratified stoichiometric combustion is in operation. The control unit 50 can carry out the examination of the step S51 by checking the answer of the step S6 of FIG. 2 for permitting or inhibiting the changeover to the stratified stoichiometric combustion mode (or by checking a set state of a stratified stoichiometric combustion permission flag).

From the step S51, the control unit 50 proceeds to a step S52 in the case of YES, and to a step S53 in the case of NO.

At the step S52, the control unit 50 sets the ignition timing by using an ignition timing retard setting map shown in the step S52 of FIG. 12. In the stratified stoichiometric combustion mode, the ignition timing is set at a most retarded point within a stable combustion limit as shown by a downward arrow in the step S52 of FIG. 12, instead of a MBT point (most fuel efficient point).

At the step S53, the control unit 50 sets the ignition timing by using a normal ignition timing setting map shown in the step S53 of FIG. 12. In the normal combustion mode other than the stratified stoichiometric combustion mode, the ignition timing is set at a MBT point to achieve a predetermined fuel consumption (or engine stability) as shown by a downward arrow in the step S53 of FIG. 12.

In the stratified stoichiometric combustion mode, even if the ignition timing is set according to the MBT, it is possible to retard the ignition timing with respect to the MBT timing point in the normal combustion mode (such as the combustion mode producing an approximately stoichiometric mixture closely around the spark plug), and at the same time to improve the engine stability (as shown in the ignition timing retard setting map), so that the goals of engine stability and exhaust temperature increase can be attained simultaneously at higher levels. Moreover, the control system of this example can increase the exhaust gas temperature significantly by retarding the ignition timing in the stratified stoichiometric combustion mode to the maximum limit within the engine stability region.

Alternatively, it is possible to retard the ignition timing in the stratified stoichiometric combustion mode to such a degree as to attain a level of engine stability equal to that in the normal combustion mode. In this case, the control system can retard the ignition timing in the stratified stoichiometric combustion mode significantly as compared to the normal combustion mode, so that the exhaust gas temperature Is increased efficiently.

In this way, the stratified stoichiometric combustion has such a characteristic that the engine stability is relatively high even in a retarded region (as shown in the map in the step S52), and the control system according to the second embodiment is arranged to utilize this characteristic to increase the exhaust temperature by retarding the ignition timing within the engine stability region (or within a region capable of obtaining the engine stability level in the normal combustion mode).

Figure 13:
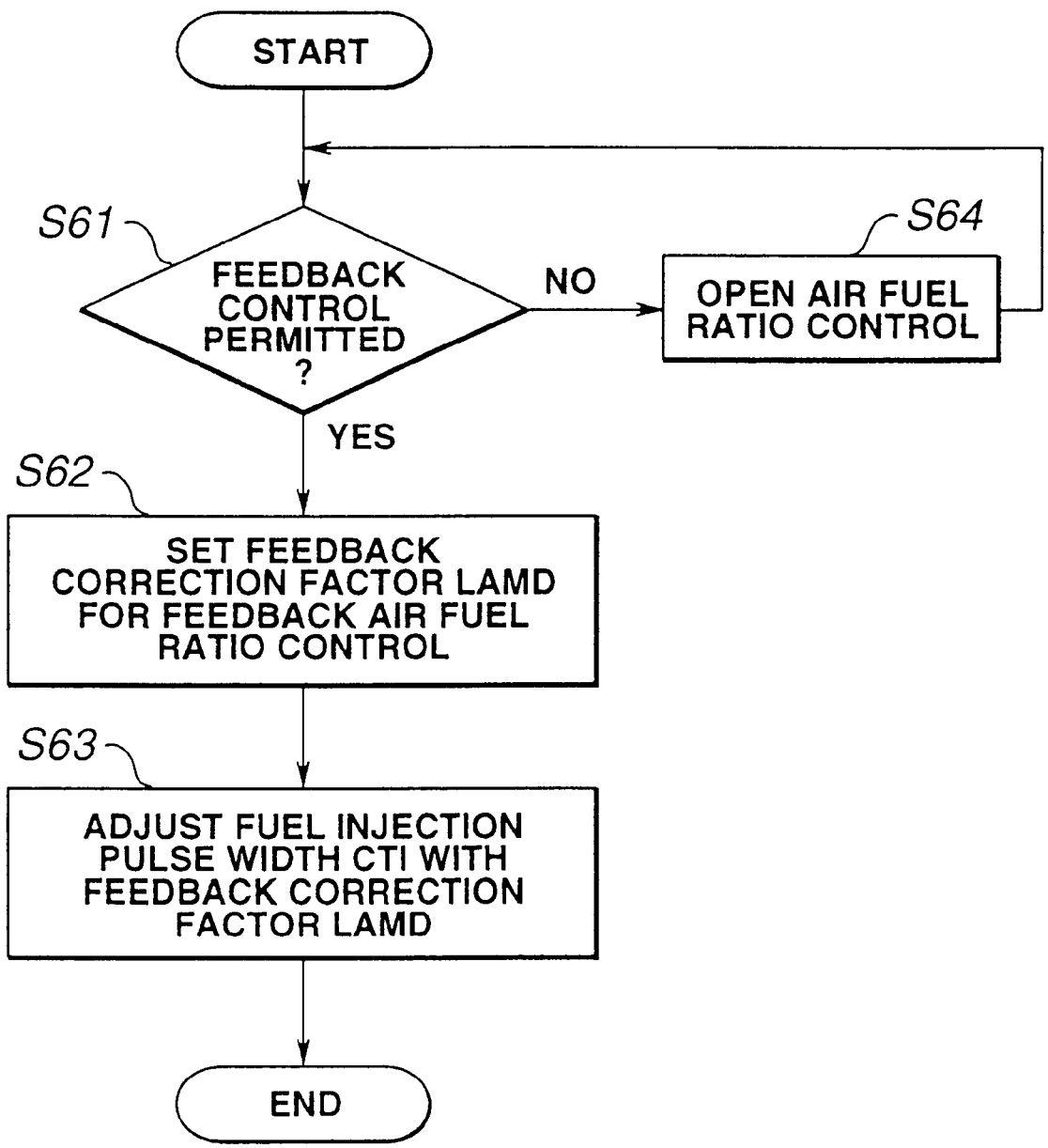
FIG. 13 is a flowchart showing a control process for a system according to a third embodiment to perform a feedback air fuel ratio control (lambda control).

FIG. 13 shows a control process according to a third embodiment of the present invention. In addition to the control operation to improve the warming up performance by the stratified stoichiometric combustion, the control system according to the third embodiment is arranged to perform a feedback air fuel ratio control based on the output of the air fuel ratio sensor 8 during the warm up period in the stratified stoichiometric combustion mode. By the feedback control, the control system can accurately control the total air fuel ratio of the engine as a whole, to the target level such as the stoichiometric level, to the better advantage of the activation of the catalytic converter 9 and reduction of HC emission. The control system can increase the temperature of the catalytic converter reliably and efficiently.

The control system according to the third embodiment is constructed as shown in FIG. 1 as in the first embodiment, and arranged to perform the control processes shown in FIGS. 2, 3, 5 and 11. In addition to the control operations substantially identical to the control operations employed in the first embodiment, the control unit 50 according to the third embodiment controls the actual air fuel ratio by the feedback control to reduce the deviation of the actual air fuel ratio from the desired target ratio in accordance with the result of the air fuel ratio measurement by the air fuel ratio sensor 9

The air fuel ratio sensor 8 is located on the upstream side of the catalytic converter 9, and the heat capacity of the air fuel ratio sensor 8 is small. Therefore, the air fuel ratio sensor 8 can be activated rapidly as compared with the catalytic converter 9. Moreover, it is possible to heat and activate the air fuel ratio sensor 8 forcibly with an electric heater. Therefore, the control system can perform the feedback air fuel ratio control properly during operation in the stratified stoichiometric combustion mode (for the warm-up of the catalytic converter 9) by using the output signal of the air fuel ratio sensor 8.

The control unit 50 according to the third embodiment carries out the feedback air fuel ratio control ($\lambda$ control) as shown in FIG. 13.

At a step S61, the control unit 50 examines whether there exists a condition for permitting the feedback (lambda) control in the stratified stoichiometric combustion mode. This examination can be conducted by checking whether the air fuel ratio sensor 8 is activated or not, as in the existing technique. The control unit 50 can determine the existence or nonexistence of this condition for the lambda control by monitoring the behavior of the output signal of the air fuel ratio sensor 8, the temperature of the engine cooling water, or the time elapsed after a start of the engine.

From the step S61, the control unit 50 proceeds to a step S62 in the case of YES and to a step S64 in the case of NO.

At the step S62, the control unit 50 performs the feedback air fuel ratio control in a manner substantially identical to the feedback (F/B) air fuel ratio control in the conventional system. In this example, the control unit 50 determines the deviation of the actual air fuel ratio from the stoichiometric ratio (theoretical ratio) by using the output signal of the air fuel ratio sensor 8 on the upstream side of the catalytic converter 9, and determines the feedback air fuel ratio correction factor LAMD in the proportional-plus-integral (PI) control law so as to reduce the deviation.

At a next step S63, the control unit 50 corrects the fuel injection pulse width CTI so that the thus-determined air fuel ratio feedback (lambda) correction factor LAMD is reflected on the fuel injection quantity. Thereafter, the control system sets the fuel injection pulse widths CTIH and CTIS and the fuel injection timings TITMH and TITMS according to the flowchart of FIG. 11, and carries out the fuel injecting operations.

When the lambda control is not permitted, on the other hand, the step S64 is reached, and the control unit 50 clamps the air fuel ratio feedback correction factor LAMD at a fixed value (1.0 in this example) to perform the open air fuel ratio control (feedforward control) and calculates the fuel injection pulse width CTI in accordance with the clamped feedback correction factor LAMD. Thereafter, the control system sets the fuel injection pulse widths CTIH and CTIS and the fuel injection timings TITMH and TITMS according to the flowchart of FIG. 11, and carries out the fuel injecting operations.

Figure 14:
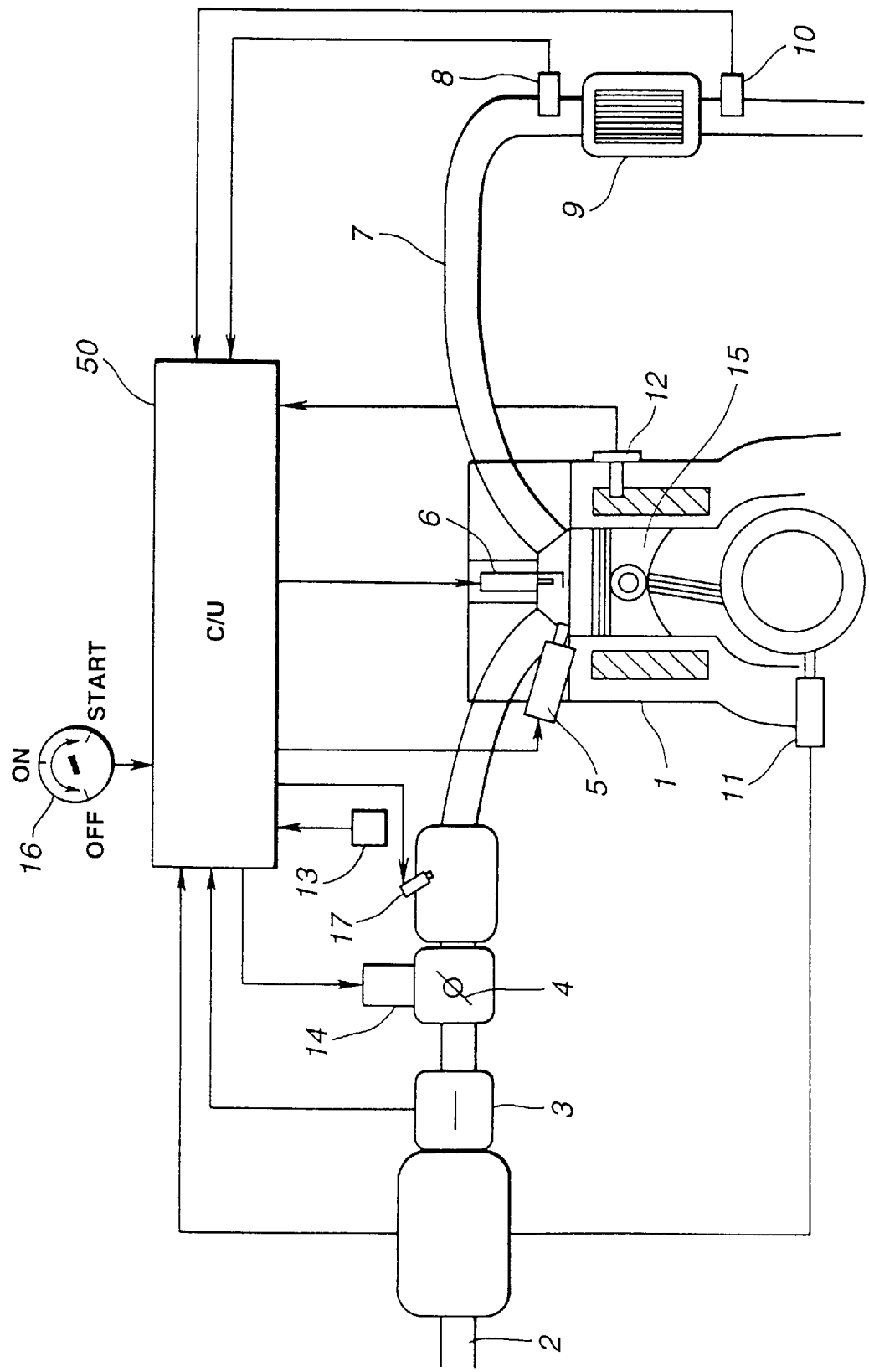
FIG. 14 is a schematic view showing a system of a first practical example according to a fourth embodiment of the present invention.
Figure 15:
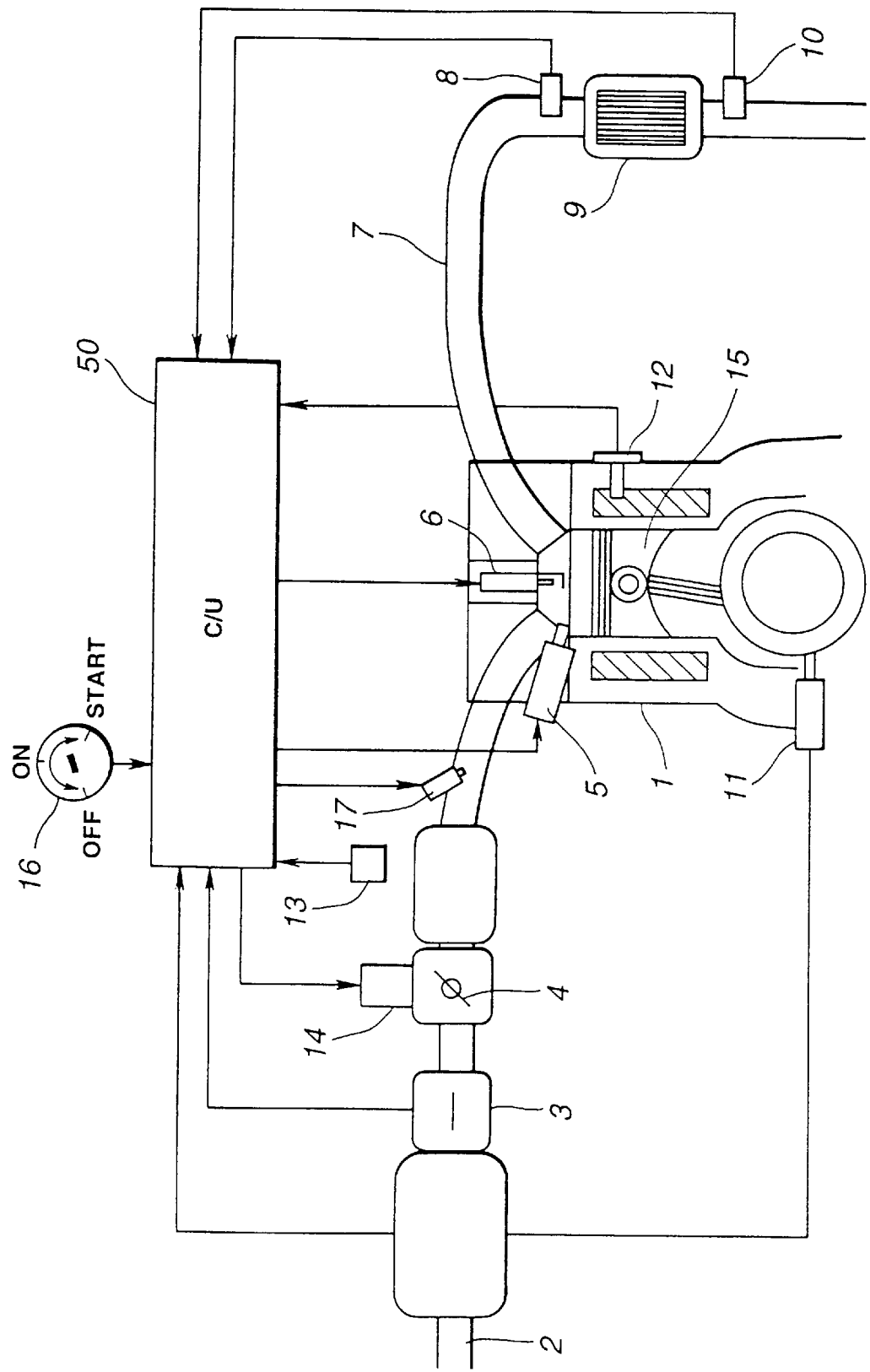
FIG. 15 is a schematic view showing a system of a second practical example according to the fourth embodiment.
Figure 16A:
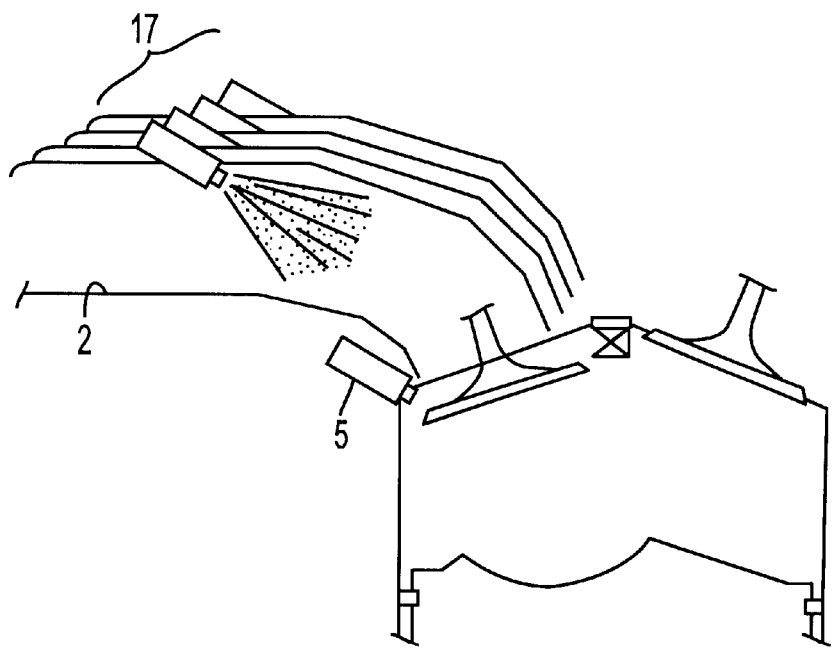
FIGS. 16A and 16B are schematic views for illustrating the intake stroke fuel injection in the systems of FIGS. 14 and 15, respectively.
Figure 16B:
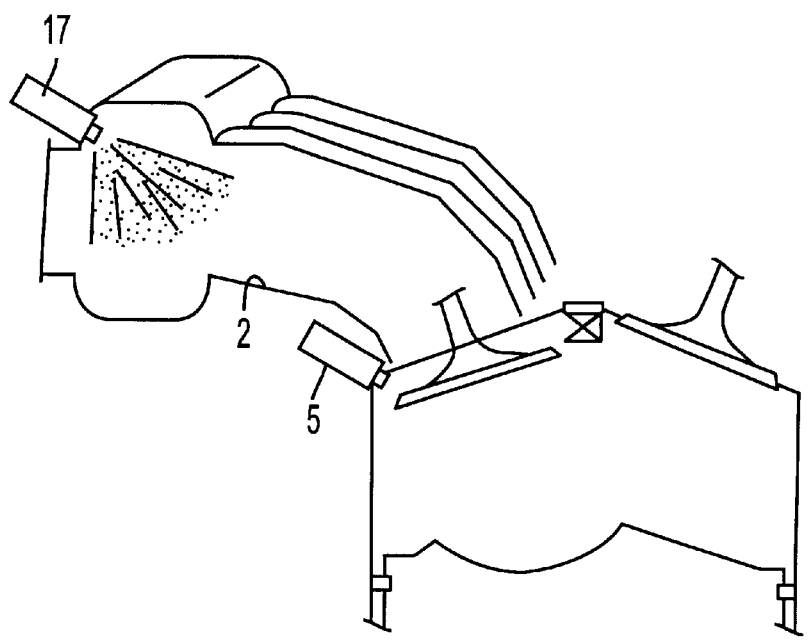

FIGS. 14, 15, 16A and 16B show a fourth embodiment of the present invention. The control system according to the fourth embodiment performs the stratified stoichiometric combustion (SS comb) by using a fuel injector 17 disposed in the intake passage 2, for the first fuel injection of the stratified stoichiometric combustion mode on the exhaust or intake stroke to produce the leaner-than-stoichiometric background mixture throughout the combustion chamber, and by using the direct fuel injector 5 for the second injection (compression inj) on the compression stroke to produce the stratified richer-than-stoichiometric region concentrated around the spark plug 6. FIGS. 14 and 16B show one example according to the fourth embodiment, and FIGS. 15 and 16A show another example.

As the fuel injector 17, it is possible to employ a conventional fuel injector for fuel injection into the intake port. In the case of an engine equipped with a direct fuel injector 5, it is possible to utilize the fuel injector 17 as an auxiliary fuel injector for assisting a starting operation of the engine or as an auxiliary fuel injector for securing a fuel quantity at full load. The fuel injector 17 serves as fuel supplying means.

The fuel injector or injectors 17 (referred to as an auxiliary fuel injector (CSV) or upstream fuel injector) are arranged as shown in FIG. 16A or FIG. 16B.

The arrangement of the fourth embodiment eliminates the need for driving the fuel injector 5 twice in each cycle, so that the requirements on the fuel injector 5 become less stringent. Therefore, it is readily possible to improve the response characteristic of the injectors by decreasing the capacity of the injectors, to reduce the minimum flow rate and to improve the durability of the injectors. The injection by the injector 17 on the exhaust or intake stroke makes it possible to elongate the time for fuel atomization.

Figure 17:
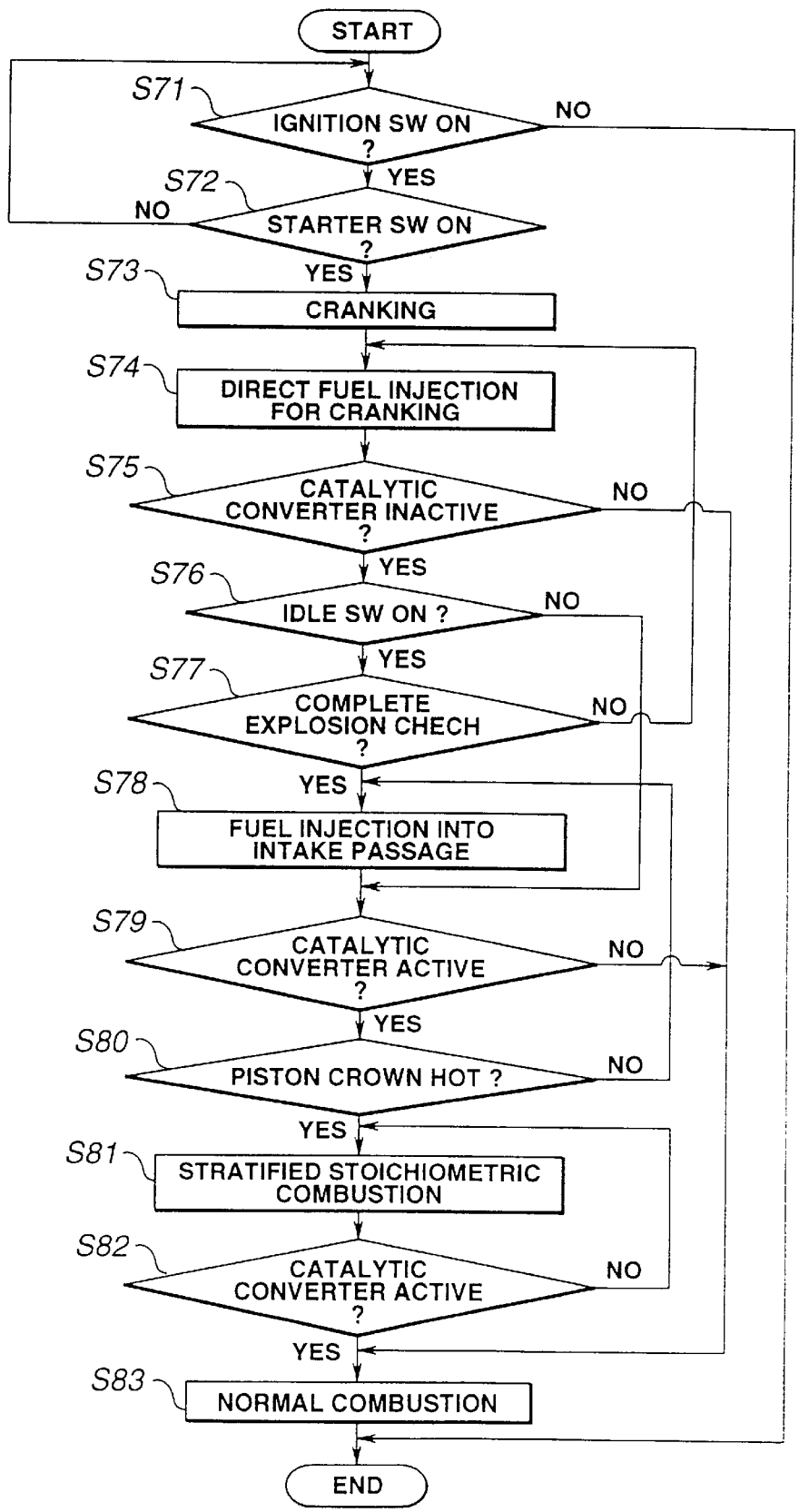
FIG. 17 is a flowchart of a control process according to the fourth embodiment.

FIG. 17 shows a control process the control unit 50 according to the fourth embodiment performs during operation of the stratified stoichiometric combustion mode.

Steps S71~S75 are substantially identical to the steps S1~S5 of FIG. 2. At the step S74, the control system performs the fuel injecting operation on the intake stroke for starting the engine by using the direct fuel injector 5 instead of the upstream fuel injector 17.

As compared to the fuel injection into the intake passage by the upstream injector 17, the direct in-cylinder fuel injection by the direct injector 5 can facilitate the starting operation of the engine, and reduce the time from a start of cranking to first explosion or complete explosion significantly.

At a step S76, the control unit 50 examines whether the idle switch is turned on. Then, the control unit 50 proceeds to a step S77 for check for complete explosion (or completion of a starting operation) in the case of the affirmative answer of the step S76, and to a step S78 to further stabilize the combustion by producing a homogeneous mixture by the auxiliary fuel injector (CSV) 17 in the case of the negative answer of the step S76 indicating the condition in which the accelerator pedal is depressed.

Figure 18:
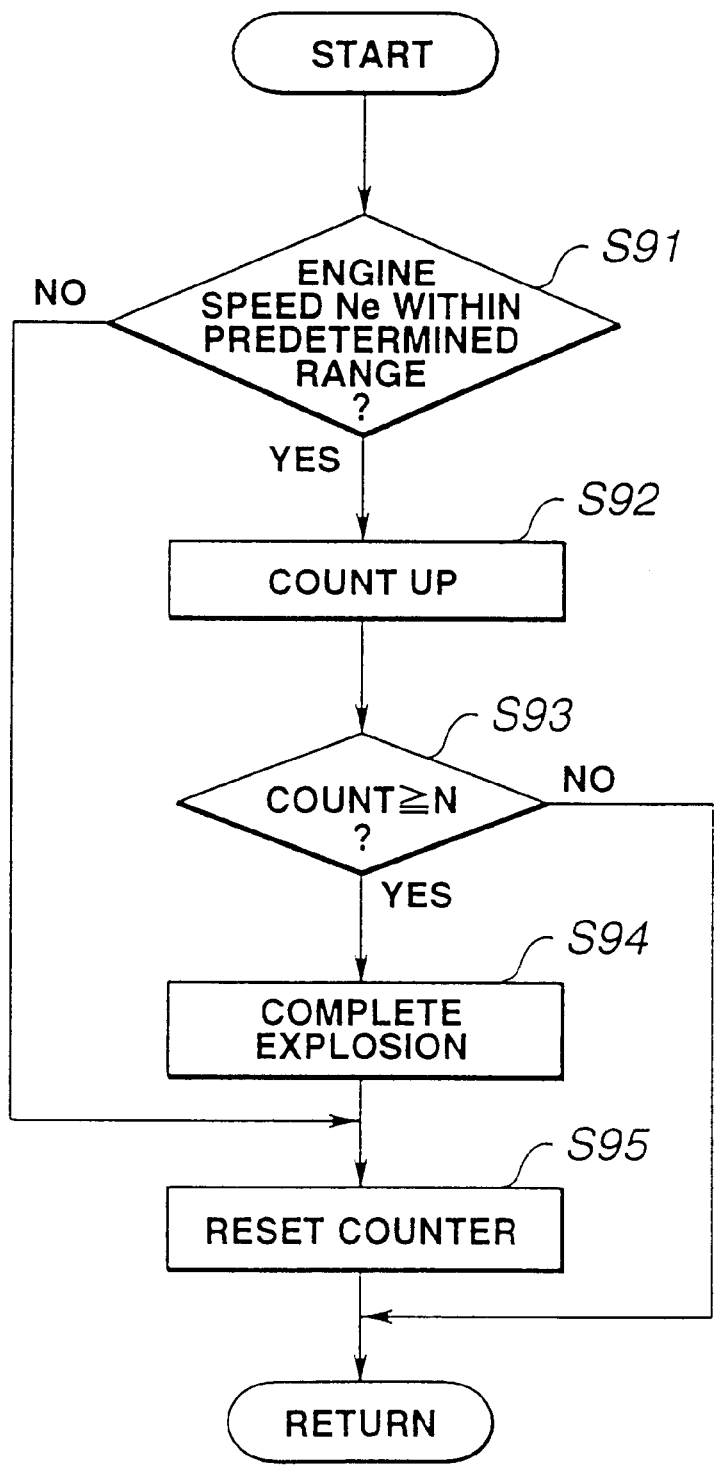
FIG. 18 is a flowchart showing a complete explosion check performed by the controller according to the fourth embodiment.

The step S77 is a decision step for performing the complete explosion check (for checking the completion of an engine starting operation). In the case of the affirmative answer of the step S77 indicating the complete explosion, the control unit 50 proceeds to the step S78 to further stabilize the combustion by producing the homogeneous mixture by the auxiliary fuel Injector (CSV) 17. In the case of the negative answer of the complete explosion check, the control unit 50 returns to the step S74 to continue the more responsive direct fuel injection (for the direct injection homogeneous charge combustion). The complete explosion check employed in this example is shown in FIG. 18.

At a step S78, the control unit 50 commands transition to the homogeneous combustion by the auxiliary fuel injector 17 which is advantageous to the engine stability as compared to the in-cylinder direct fuel injection. Thus, the combustion mode is switched from the in-cylinder fuel injection advantageous for cranking to the in-passage fuel injection into the intake passage advantageous to the stability of the engine.

At a step S79, the control unit 50 performs the activation check of the catalytic converter 9 in the same manner as the step S5 of FIG. 2. If the catalytic converter 9 is still in the inactive state (and hence the answer is YES), the control unit 50 proceeds to a step S80.

If the catalytic converter 9 is in the active state (and the answer is NO), the control unit 50 judges that the there is no need for the control for activating the catalytic converter 9, and proceeds to a step S83. At the step S83, the control unit 50 operates the engine in the normal combustion mode in accordance with the engine operating conditions. Thereafter, the control unit 50 terminates this flow.

At the step S80, the control unit 50 checks the piston crown temperature in the same manner as the step S6 of FIG. 2.

In the case of YES, the control unit 50 judges that the execution of the stratified stoichiometric combustion is appropriate, and proceeds to a step S81. In the case of NO, the control unit 50 judges that the piston crown temperature is too low to perform the stratified stoichiometric combustion, and returns to the step S78 to inhibit the stratified stoichiometric combustion mode and instead to continue the homogeneous charge combustion by the fuel injection into the intake passage with the upstream fuel injector 17.

At a step S81, the control unit 50 permits transition to the stratified stoichiometric combustion mode and carries out the stratified stoichiometric combustion with the actuating system.

In this example, the total per-cycle fuel quantity (by weight) required to achieve the most complete combustion of the fuel with the intake air quantity of the air per combustion cycle and to obtain an approximately stoichiometric air fuel ratio is divided into the first portion of about 50% to about 90% for the first injection into the intake passage, and the remaining second portion of about 50% to 10% for the compression stroke injection. The first portion (about 50% about 90%) of the total per-cycle fuel weight quantity is injected into the intake passage 2 on the exhaust or intake stroke so that a relatively lean (leaner-than-stoichiometric) homogeneous air fuel mixture is produced throughout the entirety of the combustion chamber on the intake stroke. The remaining about 50% to about 10% second portion is injected on the compression stroke so as to produce a relatively rich (richer-than-stoichiometric) stratified air fuel mixture around the spark plug 6. Then, combustion takes place in the combustion chamber in the state in which the richer region is formed around the spark plug 6, in the leaner background as shown in FIG. 9.

In this stratified stoichiometric combustion mode, the shares of the first and second portions may be so determined that the air fuel ratio of the leaner-than-stoichiometric background mixture produced in the combustion chamber on the intake stroke by the first injection into the intake passage during the exhaust or intake stroke is 16~28, and that the air fuel ratio of the richer-than-stoichiometric mixture produced around the spark plug 6 by the second injection on the compression stroke is 9~13. As long as the air fuel ratios of the mixture regions are within these ranges, it is optional to set the average air fuel ratio in the combustion chamber at a value (within a range of 13.8~18, for example) slightly deviant from the theoretical ratio.

The stratified stoichiometric combustion mode according to the fourth embodiment can make higher the exhaust gas temperature as compared with the normal homogeneous stoichiometric combustion, and moreover reduce the amount of unburned HC discharged from the combustion chamber into the exhaust passage (as shown in FIGS. 25 and 26).

Figure 19:
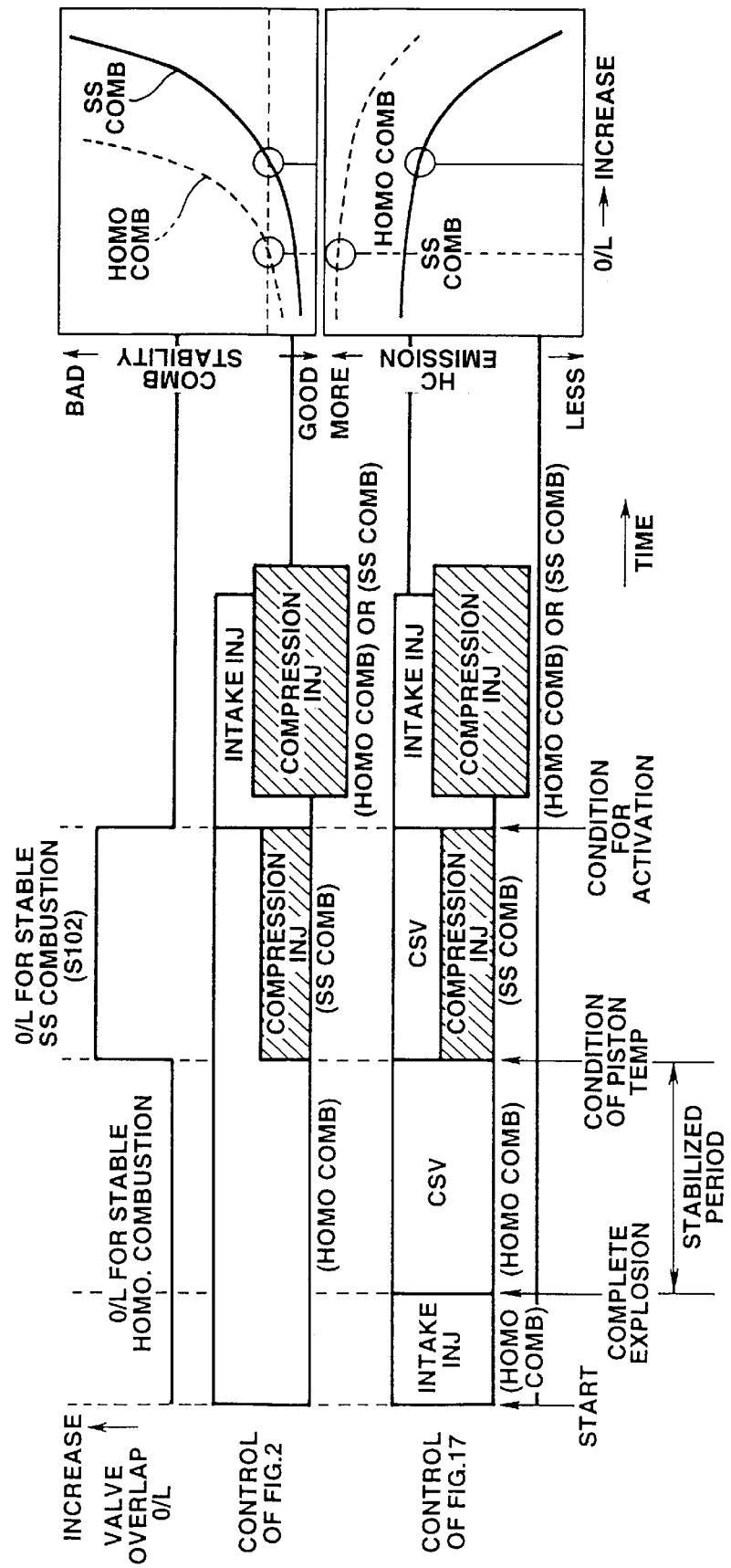
FIG. 19 is a timing chart for illustrating changeover between the stratified stoichiometric combustion mode and a normal combustion mode according to the fourth embodiment, and control of a valve overlap according to a fifth embodiment of the present invention.

The first fuel injection into the intake passage 2 by the upstream injector 17 can improve the engine stability during a period from complete explosion to activation, as compared with the in-cylinder direct first fuel injection (intake inj.) according to the first embodiment (as shown in the timing chart of FIG. 19).

With the improvement in the engine stability, the control system according to the fourth embodiment can further retard the ignition timing and thereby increase the exhaust temperature during the period from complete explosion to catalyst activation, as compared with the first embodiment. Therefore, the fourth embodiment can further reduce the HC emission and the activation time efficiently.

Reverting to the flowchart of FIG. 17, a step S82 is substantially identical to the step S8 of FIG. 2. The control unit 50 examines whether the catalytic converter 9 is activated (or the warm up operation is completed).

The control unit 50 proceeds to a step S83 in the case of YES, and returns to the step S81 to continue the stratified stoichiometric combustion mode until the completion of the activation.

At the step S83, the control unit 50 changes over the combustion mode to the normal combustion mode to achieve desired emission control performance, fuel efficiency or driveability in accordance with the engine operating conditions, and then terminates the control flow of FIG. 17.

Thus, the control system according to the fourth embodiment can reduce the HC emission and the time of the warm up operation and improve the engine stability.

FIG. 18 shows one example of a complete explosion check (start-up completion check) performed in the step S77. The flow is performed after a start of the engine.

At a step S91, the control unit 50 examines whether the engine speed Ne is within a predetermined range (or the engine speed Ne is equal to or higher than a predetermined value). The control unit 50 proceeds to a step S92 to perform the complete explosion check in the case of YES. In the case of NO, the control unit 50 proceeds to a step S95 to reset a counter and then returns.

At the step 592, the control unit 50 performs a count-up operation of the counter. At a step S93, the control unit 50 examines whether the count of the counter is equal to or greater than a predetermined number N. In the case of YES, the control unit 50 proceeds to a step S94 and judges that the explosion is complete. Thereafter, the control unit 50 resets the counter at the step S95, and then terminates the flow of FIG. 18. When the answer of the step S93 is NO, the control unit 50 returns directly and repeat this flow.

In this way, the control system can judge easily and accurately that the engine starting operation is finished (complete explosion is attained), and the engine is running stably so that a changeover of the combustion mode is unlikely to cause engine stall.

In dependence on the result of the complete explosion check of FIG. 18, the control system can timely change over the engine starting operation of the intake stroke direct fuel injection by the injector 5 to the operating for injecting the fuel into the intake passage 2 with the upstream fuel injector 17, and thereby improve the stability of the engine during a period from complete explosion to the completion of the catalyst activation.

FIGS. 19~22 show a fifth embodiment of the present invention. The control system according to the fifth embodiment has a valve adjusting mechanism (or valve timing control mechanism) for varying opening and/or closing characteristics of at least one of the intake and exhaust valves in addition to the basic structure similar to one of the preceding embodiments. With the valve adjusting mechanism, the control system according to the fifth embodiment varies the valve opening characteristic (valve overlap or valve opening or closing timing). As the valve adjusting mechanism, it is possible to employ any one of various known mechanisms such as a mechanism for varying a rotational phase or an actuating angle of the intake and/or exhaust valve by using the camshaft, and a mechanism comprising a solenoid valve for varying the valve timing.

The control system according to the fifth embodiment varies the valve overlap quantity (O/L) in the stratified stoichiometric combustion (SS comb) mode as shown in FIG. 19, and thereby increases an internal EGR quantity (rate) due to blow back (back flow) of the exhaust gas. The exhaust gas thus internally recirculated into the combustion chamber is burnt again in the cylinder, and the HC percentage in the exhaust gas mixture is decreased (that is, the CO percentage is increased) to promote the oxidizing reaction in the exhaust passage 7 and the catalytic converter 9. Moreover, the Introduction of the relatively hot exhaust gas mixture into the cylinder increases the gas temperature in the cylinder, and the temperature increase promotes the vaporization of the fuel and reduces the unburned HC content.

Figure 20:
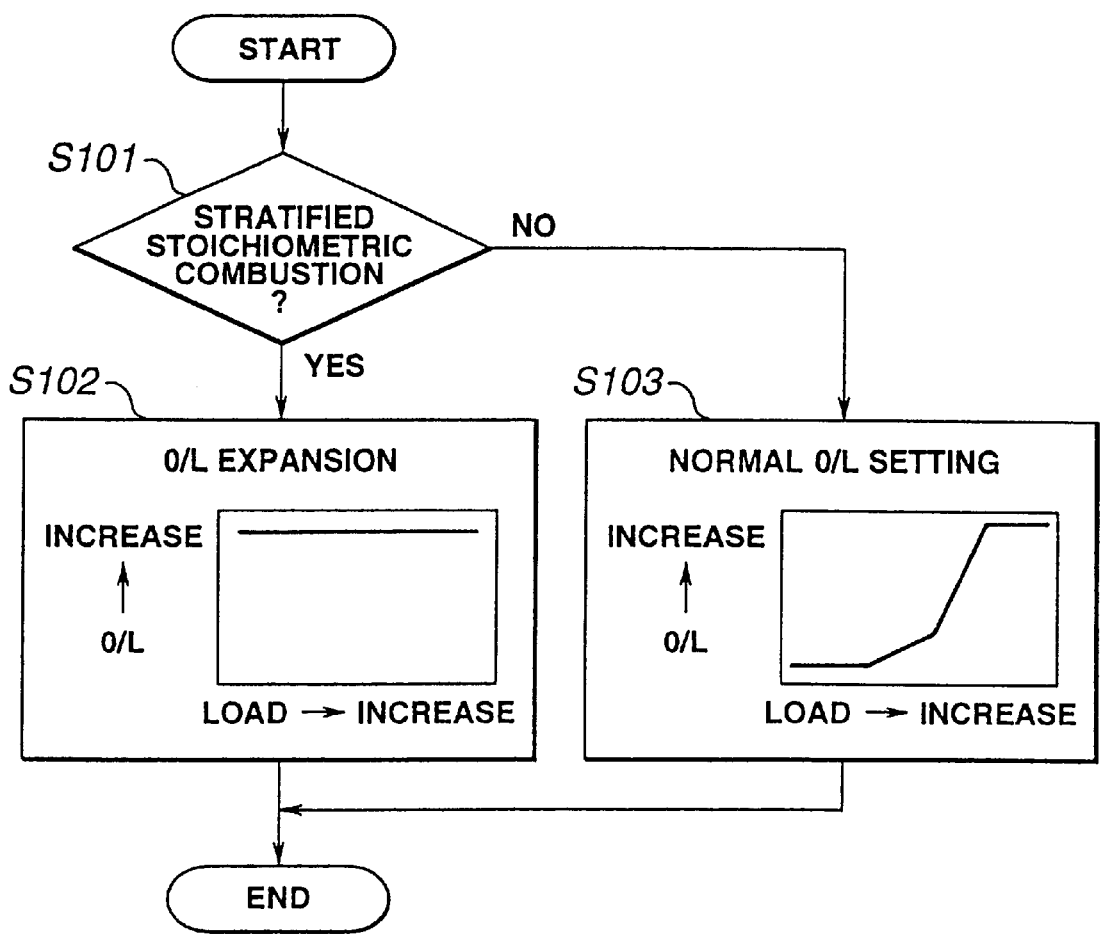
FIG. 20 is a flowchart showing a valve overlap control process for the system according to the fifth embodiment.

FIG. 20 shows a control process the control unit 50 of the fifth embodiment performs.

At a step S101, the control unit 50 examines whether the stratified stoichiometric combustion is in operation. The control unit 50 proceeds to a step S102 in the case of YES, and to a step S103 in the case of NO.

Figure 21:
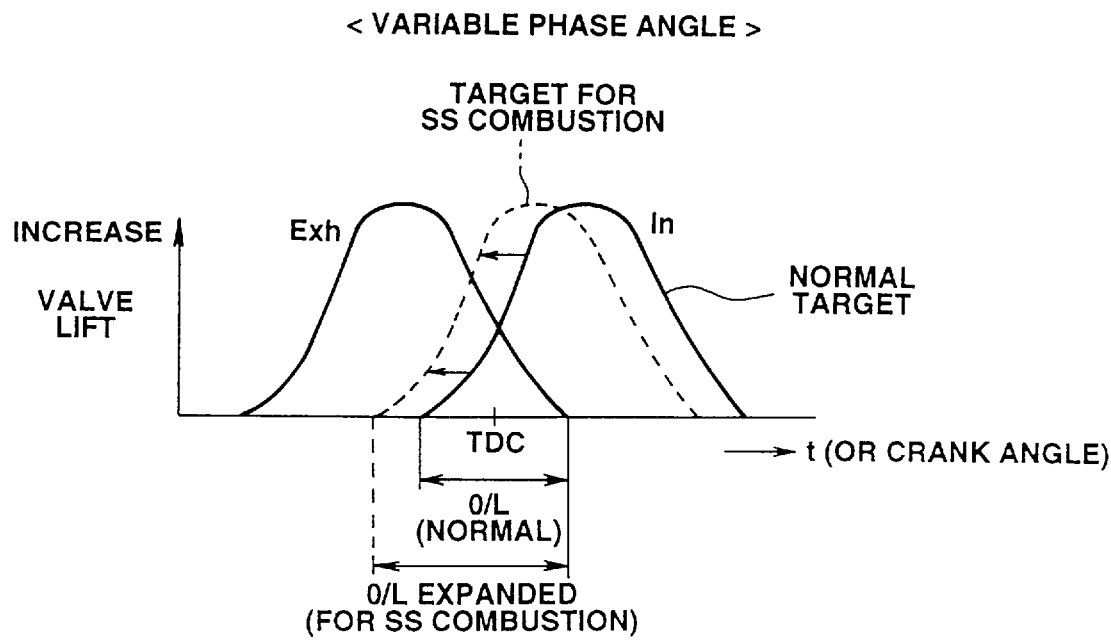
FIG. 21 is a timing chart for illustrating the valve overlap control in a first example according to the fifth embodiment (of a variable phase angle type).
Figure 22:
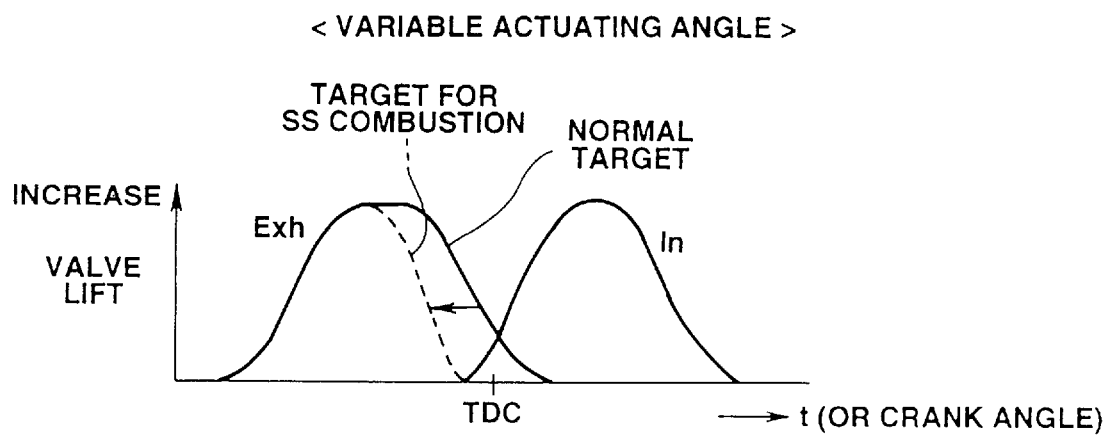
FIG. 22 is a timing chart for illustrating the valve overlap control in a second example according to the fifth embodiment (of a variable actuating angle type).

At the step S102, the control unit 50 determines a target O/L width suitable for the stratified stoichiometric combustion by using an O/L width map shown in the step S102 of FIG. 20, to increase or expand the valve overlap (O/L) quantity or width (as shown in FIG. 21).

Then, the control system achieves the target O/L width by advancing the valve opening timing of the intake valve as shown in FIG. 21 (or retarding the valve closing timing of the exhaust valve).

At the step S103, the control unit 50 determines the target O/L width for the normal combustion mode by using an O/L width map shown in the step S103 of FIG. 20. Then, the control system controls the valve adjusting mechanism to control the opening timing of the intake valve and to achieve the target O/L width in the normal mode.

It is possible to increase the internal EGR quantity during the operation in the stratified stoichiometric combustion mode by decreasing the actuating angle of the exhaust valve and advancing the closing timing of the exhaust valve to decrease the exhaust or scavenge efficiency with the variable valve timing mechanism designed to vary the valve actuating angle. (Alternatively, it is further possible to increase the internal EGR quantity due to a back flow of the exhaust gas by decreasing the actuating angle of the intake valve and thereby decreasing the O/L quantity.)

In this way, the control system according to the fifth embodiment increases the internal EGR quantity in the stratified stoichiometric mode by adjusting at least one of the opening and closing timings or characteristics of the intake and exhaust valves. It is possible to employ any of known valve timing adjusting mechanisms and to employ any one of a variety of known techniques for increasing the internal EGR quantity.

Figure 23:
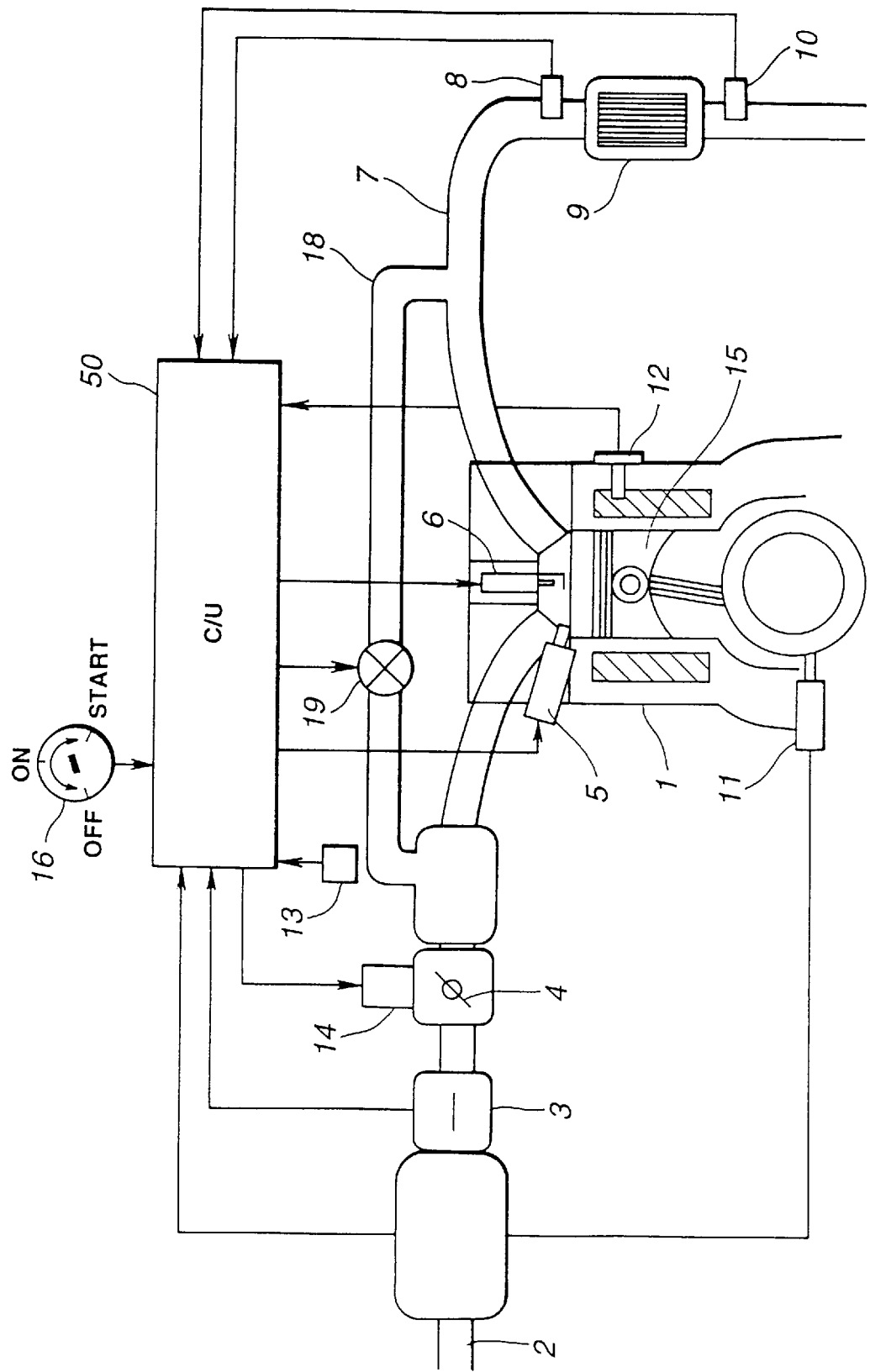
FIG. 23 is a schematic view showing an engine system equipped with an EGR system according to a variation of the fifth embodiment.

FIG. 23 shows a variation of the control system according to the fifth embodiment. The control system shown in FIG. 23 is arranged to increase an external EGR quantity (or rate) during operation in the stratified stoichiometric combustion mode, to obtain the same effects of the fifth embodiment.

An EGR system shown in FIG. 23 comprises an exhaust gas recirculation (EGR) passage 18 and an EGR control valve 19. The EGR passage 18 branches off from the exhaust passage 7 and extends to the intake passage 2 to recirculate part of the exhaust gas into the intake passage 2. The EGR control valve 19 is disposed in the EGR passage 18 and arranged to control the flow of the EGR gas recirculated through the EGR passage 18. The control unit 50 is arranged to control the opening degree of the EGR control valve 19.

During operation in the stratified stoichiometric combustion mode, the control unit 50 increases the (external) EGR quantity to obtain the above-mentioned effects obtained by the increase of the Internal EGR quantity. By thus controlling the external EGR quantity in the stratified stoichiometric combustion mode, this control system can reduce the HC emission and activate the catalytic converter 9 quickly.

Thus, by utilizing the stratified stoichiometric combustion superior in the combustion stability, the control system according to the fifth embodiment increases the EGR quantity to increase the exhaust temperature and to further reduce the amount of unburned HC.

In each of the embodiments, it is optional to utilize a in-cylinder airflow such as swirl motion in the stratified stoichiometric combustion. The in-cylinder airflow is the motion of air in the combustion chamber (inclusive of horizontal motion and vertical motion). The control system can improve the stability of combustion, further reduce the HC emission and promote the catalyst activation by performing the stratified stoichiometric combustion in the strong swirl condition (or strong in-cylinder airflow condition).

Figure 24:
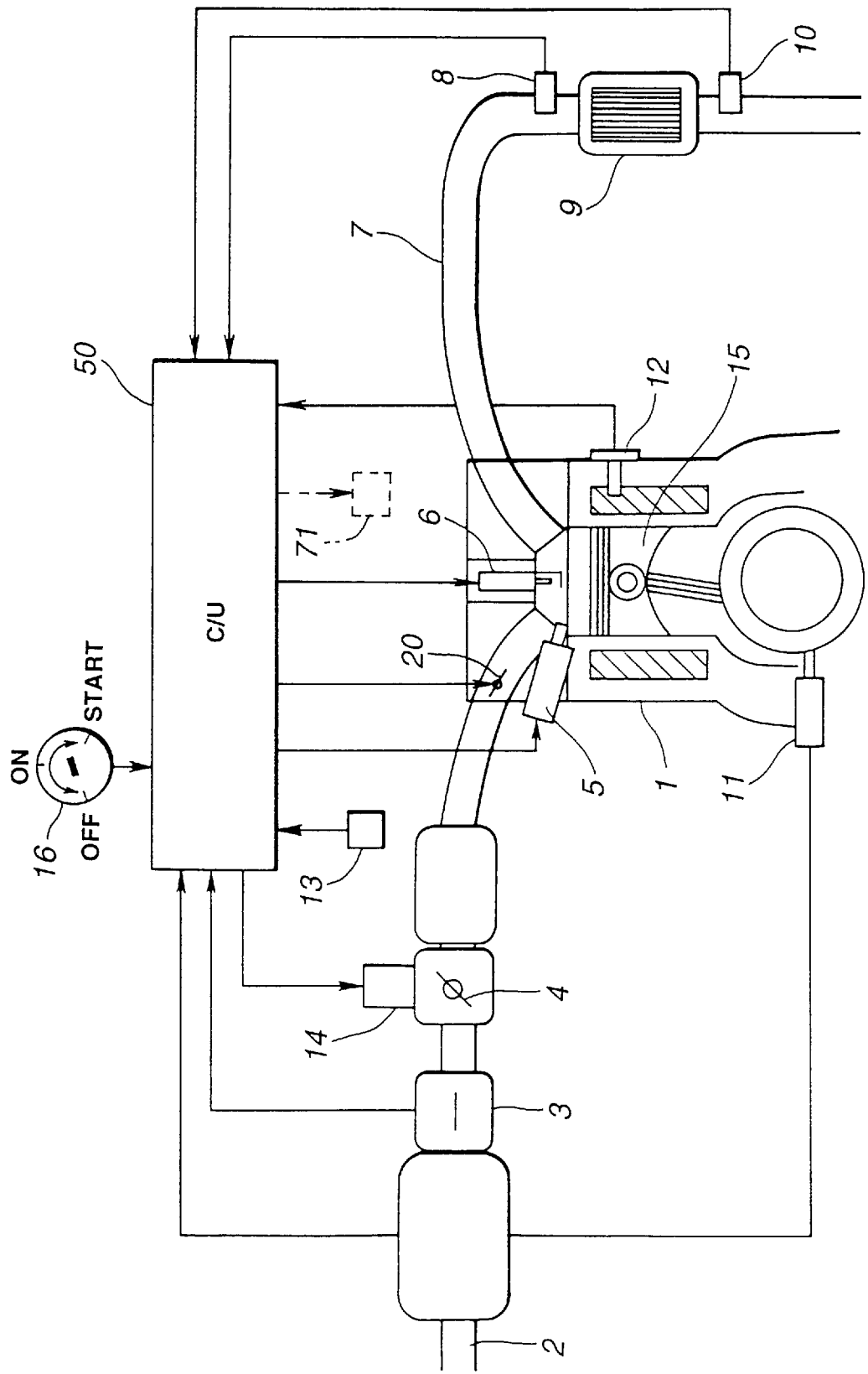
FIG. 24 is a schematic view showing an engine equipped with a swirl valve which can be employed in the present invention.

In an example shown in FIG. 24, a swirl control valve is disposed in the intake passage 2. The control unit 50 sends a drive signal to the swirl control valve 20 and thereby control the opening and closing of the swirl control valve 20 In accordance with the engine operating conditions. In this example, the control unit 50 makes the in-cylinder swirl stronger by closing the swirl control valve 20 during operation in the stratified stoichiometric combustion mode (as in the stratified lean combustion mode) and makes the swirl weaker during operation by opening the swirl control valve 20 during operation in the homogeneous stoichiometric combustion mode or the homogeneous lean combustion mode. As the swirl control valve 20, it is possible to employ a swirl control valve of an earlier technology. In FIG. 24, the valve adjusting mechanism (or valve timing control mechanism) is schematically shown by broken line at 71.

To perform the stratified stoichiometric combustion in the first through third embodiments, the fuel injector 5 is opened twice, first for the intake stroke injection and second for the compression stroke injection. However, it is optional to construct the control system in such a manner that the fuel injector 5 is opened on the intake stroke and closed on the compression stroke. In this case, the duration of the fuel injection extends from the intake stroke to the compression stroke.

The control system according to the present invention may be arranged to produce a request signal representing the request condition requesting the temperature increase of the catalytic emission control device (by the stratified stoichiometric combustion) when an engine starting or cranking operation is detected. In this case, the control system can activate the catalytic device quickly after the start of the engine.

The entire contents of a prior Japanese Patent Application No. 10-66927 with a filing date of Mar. 17, 1998 are hereby incorporated by reference.

Although the invention has been described above by reference to certain embodiments of the invention, the invention is not limited to the embodiments described above. Modifications and variation of the embodiments described above will occur to those skilled in the art, in light of the above teachings. The scope of the invention is defined with reference to the following claims.

What is claimed is:

1. An engine system comprising:
 a direct injection spark ignition internal combustion engine which comprises a fuel injector for injecting fuel directly into a combustion chamber of the engine, and a spark plug for igniting an air fuel mixture in the combustion chamber; and
 an engine controller for operating the engine in a first stratified charge combustion mode for producing a substantially stoichiometric air fuel mixture concentrated around the spark plug at a time of ignition in a predetermined engine operating region by variably controlling ignition timing and at least one of fuel injection quantity and timing during a compression stroke, for detecting a predetermined request condition requesting a temperature increase of a catalytic emission control device disposed in an exhaust passage of the engine, and for operating the engine in a second stratified charge combustion mode for producing a richer-than-stoichiometric air fuel mixture of a rich air fuel ratio richer than a stoichiometric ratio concentrated around the spark plug at the time of ignition by controlling the fuel injection quantity and fuel injection timing of compression stroke fuel injection on the compression stroke by the fuel injector and the ignition timing of the spark plug when the predetermined request condition is detected, wherein the richer-than-stoichiometric air fuel mixture concentrated around the spark plug at the time of ignition is in an ignitable atomized state with an ignitable air fuel ratio, and wherein the controller sets a fuel atomization interval from a time of a compression stroke fuel injection to the time of ignition longer in the second stratified combustion mode than in the first stratified combustion mode.

2. The engine system as claimed in claim 1 wherein the controller controls the fuel injection quantity and fuel injection timing of the compression stroke fuel injection and the ignition timing in the second stratified combustion mode in a manner to set an air fuel ratio of an air fuel mixture concentrated around the spark plug at the time of ignition in a range of 9~13.

3. The engine system as claimed in claim 1 wherein the controller is configured to differentiate the ignition timing between the first and second stratified combustion modes in a manner that the ignition timing in the second stratified combustion mode is retarded with respect to the ignition timing in the first stratified combustion mode.

4. The engine system as claimed in claim 1 wherein the controller is configured to differentiate an EGR quantity of exhaust gas recirculation of the engine between the first and second stratified combustion modes in a manner that the EGR quantity is greater in the second stratified combustion mode than in the first stratified combustion mode.

5. The engine system as claimed in claim 1 wherein the controller is configured to control fuel supply to the engine in a manner to distribute a homogeneous leaner-than-stoichiometric background air fuel mixture over the combustion chamber, and then to produce the richer-than-stoichiometric air fuel mixture concentrated around the spark plug at the time of ignition to achieve the second stratified combustion mode when the request condition is detected, the leaner-than-stoichiometric air fuel mixture having an air fuel ratio which is leaner than the stoichiometric ratio and which allows flame propagation.

6. The engine system as claimed in claim 5 wherein the controller is configured to set the air fuel ratio of the homogeneous leaner-than-stoichiometric background air fuel mixture distributed entirely over the combustion chamber in a range of 16~28.

7. The engine system as claimed in claim 5 wherein the controller is configured to produce the homogeneous leaner-than-stoichiometric background air fuel mixture distributed homogeneously over the combustion chamber by driving the fuel injector on an intake stroke.

8. The engine system as claimed in claim 5 wherein a fuel supplying system for the engine comprises a fuel supplying device for supplying fuel into an intake passage of the engine to produce the homogeneous leaner-than-stoichiometric background air fuel mixture distributed homogeneously over the combustion chamber in response to a control signal of the controller.

9. The engine system as claimed in claim 8 wherein the controller is configured to drive the fuel supplying device within a period comprising an exhaust stroke and the intake stroke to inject the fuel into the intake passage to produce the homogeneous leaner-than-stoichiometric air fuel mixture distributed over the combustion chamber.

10. The engine system as claimed in claim 5 wherein the richer-than-stoichiometric air fuel mixture concentrated around the spark plug at the time of ignition is in an ignitable atomized state of an ignitable air fuel ratio.

11. The engine system as claimed in claim 1 wherein an average air fuel ratio in the combustion chamber is in a range of 13.8~18 in the second stratified charge combustion mode.

12. The engine system as claimed in claim 1 wherein an average air fuel ratio in the combustion chamber is substantially stoichiometric in the second stratified charge combustion mode.

13. The engine system as claimed in claim 1 wherein the engine system further comprises an air fuel ratio sensor disposed in an exhaust passage for the engine, and the controller performs a feedback air fuel ratio control so as to make an average air fuel ratio in the combustion chamber equal to a stoichiometric ratio, in accordance with an output signal of the air fuel ratio sensor.

14. The engine system as claimed in claim 1 wherein the controller inhibits the second stratified combustion mode after the catalytic emission control device is activated.

15. The engine system as claimed in claim 1 wherein the controller comprises a condition discriminating section for producing a request signal when the predetermined request condition is detected, and a controlling section for operating the engine in the second stratified combustion mode when the request signal is present.

16. The engine system as claimed in claim 15 wherein the condition discriminating section detects the predetermined request condition by monitoring a condition of an exhaust system comprising the catalytic emission control device to determine whether the catalytic emission control device is in an active state.

17. The engine system as claimed in claim 1 wherein the engine controller is configured to operate the engine in the second stratified charge combustion mode by performing first and second fuel injections in each engine operating cycle for each cylinder of the engine, the first fuel injection being carried out prior to the compression stroke to produce a homogeneous leaner-than-stoichiometric background air fuel mixture throughout the combustion chamber, the second fuel injection being carried out on the compression stroke to produce the richer-than-stoichiometric air fuel mixture existing only around the spark plug.

18. An engine system comprising:

a direct injection spark ignition internal combustion engine which comprises a fuel injector for injecting fuel directly into a combustion chamber of the engine, and a spark plug for igniting an air fuel mixture in the combustion chamber; and an engine controller for operating the engine in a first stratified charge combustion mode for producing a substantially stoichiometric air fuel mixture concentrated around the spark plug at a time of ignition in a predetermined engine operating region by variably controlling ignition timing and at least one of fuel injection quantity and timing during a compression stroke, for detecting a predetermined request condition requesting a temperature increase of a catalytic emission control device disposed in an exhaust passage of the engine, and for operating the engine in a second stratified charge combustion mode for producing a richer-than-stoichiometric air fuel mixture of a rich air fuel ratio richer than a stoichiometric ratio concentrated around the spark plug at the time of ignition by controlling the fuel injection quantity and fuel injection timing of compression stroke fuel injection on the compression stroke by the fuel injector and the ignition timing of the spark plug when the predetermined request condition is detected, wherein the controller is configured to judge that the request condition exists when a starting operation of the engine is detected.

19. An engine system comprising:

a direct injection spark ignition internal combustion engine which comprises a fuel injector for injecting fuel directly into a combustion chamber of the engine, and a spark plug for igniting an air fuel mixture in the combustion chamber; and an engine controller for operating the engine in a first stratified charge combustion mode for producing a substantially stoichiometric air fuel mixture concentrated around the spark plug at a time of ignition in a predetermined engine operating region by variably controlling ignition timing and at least one of fuel injection quantity and timing during a compression stroke, for detecting a predetermined request condition requesting a temperature increase of a catalytic emission control device disposed in an exhaust passage of the engine, and for operating the engine in a second stratified charge combustion mode for producing a richer-than-stoichiometric air fuel mixture of a rich air fuel ratio richer than a stoichiometric ratio concentrated around the spark plug at the time of ignition by controlling the fuel injection quantity and fuel injection timing of compression stroke fuel injection on the compression stroke by the fuel injector and the ignition timing of the spark plug when the predetermined request condition is detected, wherein the controller is configured to inhibit the second stratified combustion mode when a piston temperature of the engine is lower than a predetermined temperature.

20. An engine system comprising:

a direct injection spark ignition internal combustion engine which comprises a fuel injector for injecting fuel directly into a combustion chamber of the engine, and a spark plug for igniting an air fuel mixture in the combustion chamber; and an engine controller for operating the engine in a first stratified charge combustion mode for producing a substantially stoichiometric air fuel mixture concentrated around the spark plug at a time of ignition in a predetermined engine operating region by variably controlling ignition timing and at least one of fuel injection quantity and timing during a compression stroke, for detecting a predetermined request condition requesting a temperature increase of a catalytic emission control device disposed in an exhaust passage of the engine, and for operating the engine in a second stratified charge combustion mode for producing a richer-than-stoichiometric air fuel mixture of a rich air fuel ratio richer than a stoichiometric ratio concentrated around the spark plug at the time of ignition by controlling the fuel injection quantity and fuel injection timing of compression stroke fuel injection on the compression stroke by the fuel injector and the ignition timing of the spark plug when the predetermined request condition is detected, wherein the controller changes over an engine combustion mode between the second stratified charge combustion mode and a normal combustion mode gradually with time.

21. An engine system comprising:

a direct injection spark ignition internal combustion engine which comprises a fuel injector for injecting fuel directly into a combustion chamber of the engine, and a spark plug for igniting an air fuel mixture in the combustion chamber;

first means for operating the engine in a first stratified charge combustion mode for producing a substantially stoichiometric air fuel mixture concentrated around the spark plug at a time of ignition in a predetermined engine operating region by variably controlling ignition timing and at least one of fuel injection quantity and timing during a compression stroke;

second means for detecting a predetermined request condition requesting a temperature increase of a catalytic emission control device disposed in an exhaust passage of the engine;

third means for operating the engine in a second stratified charge combustion mode for producing a richer-than-stoichiometric air fuel mixture of a rich air fuel ratio richer than a stoichiometric ratio concentrated around the spark plug at the time of ignition by controlling the fuel injection quantity and fuel injection timing of compression stroke fuel injection on the compression stroke by the fuel injector and the ignition timing of the spark plug when the predetermined request condition is detected, wherein the richer-than-stoichiometric air fuel mixture concentrated around the spark plug at the time of ignition is in an ignitable atomized state with an ignitable air fuel ratio, and wherein the first means sets a fuel atomization interval from a time of a compression stroke fuel injection to the time of ignition longer in the second stratified combustion mode than in the first stratified combustion mode.

22. An engine control process for controlling a direct injection spark ignition internal combustion engine which comprises a fuel injector for injecting fuel directly into a combustion chamber of the engine, and a spark plug for igniting an air fuel mixture in the combustion chamber, the engine control process comprising:

operating the engine in a first stratified charge combustion mode for producing a substantially stoichiometric air fuel mixture concentrated around the spark plug at a time of ignition in a predetermined engine operating region by variably controlling ignition timing and at least one of fuel injection quantity and timing during a compression stroke;

detecting a predetermined request condition requesting a temperature increase of a catalytic emission control device disposed in an exhaust passage of the engine;

operating the engine in a second stratified charge combustion mode for producing a richer-than-stoichiometric air fuel mixture of a rich air fuel ratio richer than a stoichiometric ratio concentrated around the spark plug at the time of ignition by controlling the fuel injection quantity and fuel injection timing of compression stroke fuel injection on the compression stroke by the fuel injector and the ignition timing of the spark plug when the predetermined request condition is detected, wherein the richer-than-stoichiometric air fuel mixture concentrated around the spark plug at the time of ignition is in an ignitable atomized state with an ignitable air fuel ratio; and setting a fuel atomization interval from a time of a compression stroke fuel injection to the time of ignition longer in the second stratified combustion mode than in the first stratified combustion mode.

* * * * *